United States Patent
Lovberg et al.

(10) Patent No.: US 7,680,516 B2
(45) Date of Patent: *Mar. 16, 2010

(54) MOBILE MILLIMETER WAVE COMMUNICATION LINK

(75) Inventors: John Lovberg, San Diego, CA (US); David Lilly, San Diego, CA (US); Eric Korevaar, La Jolla, CA (US); Richard Chedester, Whately, MA (US)

(73) Assignee: Trex Enterprises Corp., San Diego, CA (US)

( * ) Notice: Subject to any disclaimer, the term of this patent is extended or adjusted under 35 U.S.C. 154(b) by 1005 days.

This patent is subject to a terminal disclaimer.

(21) Appl. No.: 11/249,787

(22) Filed: Oct. 12, 2005

(65) Prior Publication Data

US 2006/0178142 A1    Aug. 10, 2006

Related U.S. Application Data

(63) Continuation-in-part of application No. 10/046,348, filed on Oct. 25, 2001, now abandoned, which is a continuation-in-part of application No. 09/847,629, filed on May 2, 2001, now Pat. No. 6,556,836, and a continuation-in-part of application No. 09/872,542, filed on Jun. 2, 2001, now abandoned, and a continuation-in-part of application No. 09/872,621, filed on Jun. 2, 2001, now abandoned, and a continuation-in-part of application No. 09/882,482, filed on Jun. 14, 2001, now Pat. No. 6,665,546, and a continuation-in-part of application No. 09/952,591, filed on Sep. 14, 2001, now Pat. No. 6,714,800, and a continuation-in-part of application No. 09/965,875, filed on Sep. 28, 2001, now abandoned, application No. 11/249,787, which is a continuation-in-part of application No. 10/061,872, filed on Jan. 31, 2002, now abandoned, and a continuation-in-part of application No. 10/127,886, filed on Apr. 23, 2002, now abandoned, and a continuation-in-part of application No. 10/196,486, filed on Jul. 15, 2002, and a continuation-in-part of application No. 10/319,058, filed on Dec. 12, 2002, now Pat. No. 7,065,326, and a continuation-in-part of application No. 10/799,225, filed on Mar. 12, 2004, now Pat. No. 7,062,293, and a continuation-in-part of application No. 10/859,006, filed on Jun. 2, 2004, now abandoned.

(51) Int. Cl.
*H04M 1/00* (2006.01)

(52) U.S. Cl. .................. 455/562.1; 455/431; 455/454; 455/67.15

(58) Field of Classification Search ................ 455/454, 455/431, 517, 562.1, 570, 63.1, 569.2, 8, 455/73, 277.1–277.2, 272, 278.1, 25, 67.11, 455/67.15, 63.4, 66.1, 77; 343/894, 840, 343/720; 332/141
See application file for complete search history.

(56) References Cited

U.S. PATENT DOCUMENTS

| | | | |
|---|---|---|---|
| 6,016,313 A * | 1/2000 | Foster et al. ................. 370/330 |
| 6,169,910 B1 * | 1/2001 | Tamil et al. ............... 455/562.1 |
| 6,307,523 B1 * | 10/2001 | Green et al. ........... 343/781 CA |
| 6,819,943 B2 * | 11/2004 | Dalal ....................... 455/562.1 |
| 7,136,013 B2 * | 11/2006 | Hanawa et al. ................ 342/70 |
| 2002/0164958 A1 * | 11/2002 | Slaughter et al. .............. 455/73 |
| 2003/0224801 A1 * | 12/2003 | Lovberg et al. ............. 455/454 |

* cited by examiner

*Primary Examiner*—John Lee
(74) *Attorney, Agent, or Firm*—John R. Rose

(57) ABSTRACT

A point-to-point, wireless, millimeter wave communications link between two stations at least one of which is a mobile station. A millimeter wave transmitter system operating at frequencies higher than 57 GHz with a tracking antenna producing a beam having a half-power beam width of about 2 degrees or less and a millimeter wave receiver also with a tracking antenna having a half-power beam width of about 2 degrees or less. In preferred embodiments each mobile station has a global position system (GPS) and a radio transmitter and both tracking antennas are pointed utilizing GPS information from the mobile station or stations. The GPS information preferably is transmitted via a low frequency, low data rate radio. Each millimeter wave unit is capable of transmitting and/or receiving, through the atmosphere, digital information to/from the other station at rates in excess of 155 million bits per second during normal weather conditions. In preferred embodiments actually built and tested by Applicants digital information has been transmitted at rates of 1.25 gigabits per second. Preferred communication links described here are millimeter wave links operating at frequencies of 71-73 GHz and 74-76 GHz mounted on simple two-axis gimbals. Pointing information of the required accuracy is provided by GPS receivers and standard radio links which send the GPS calculated positions to the millimeter wave systems at the opposite end of the link. In these embodiments there is no need for any complicated closed loop pointing information derived from received signal intensity or phase. On moving platforms locally generated inertial attitude information is combined with the GPS positions to control pointing of the gimbaled transceivers.

4 Claims, 16 Drawing Sheets

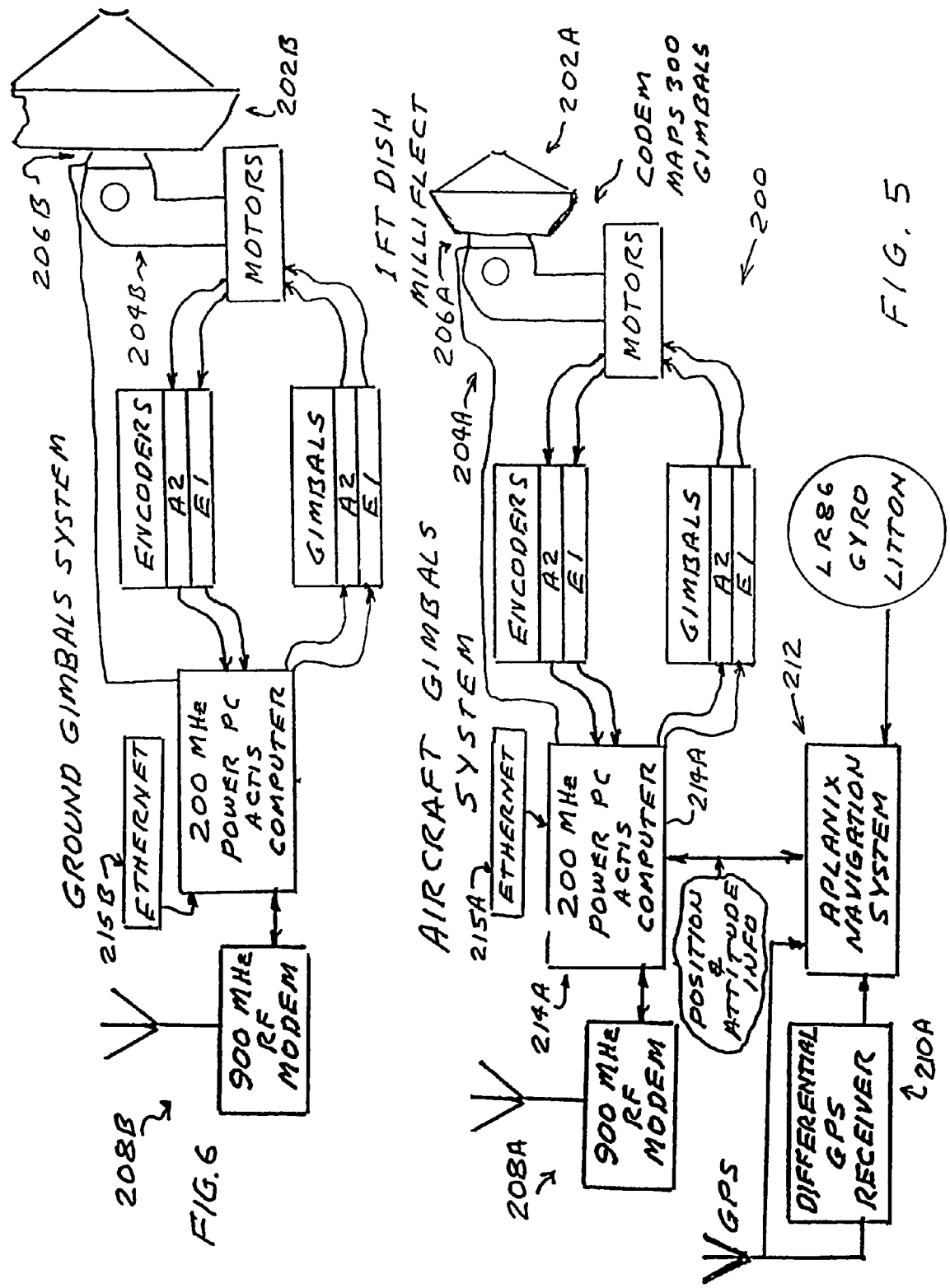

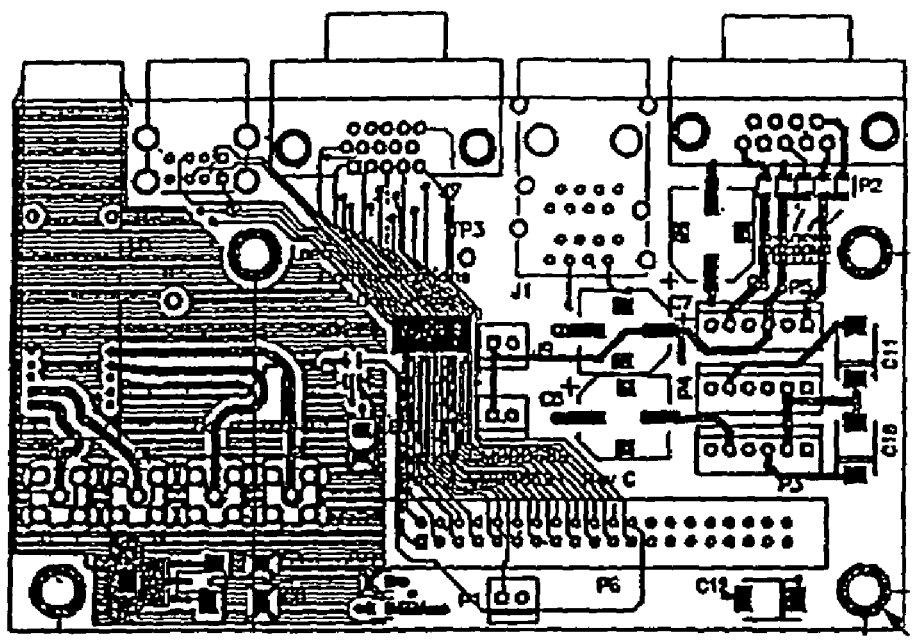
TOP
FIG. 17
FIG. 18
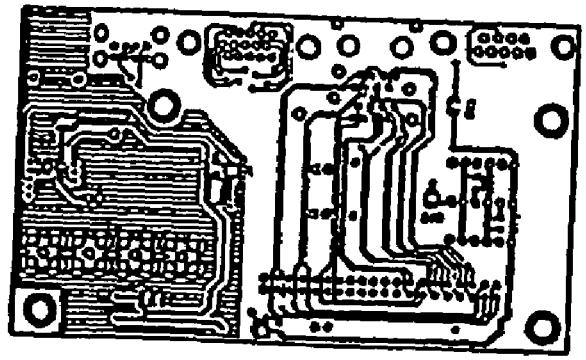
BOTTOM

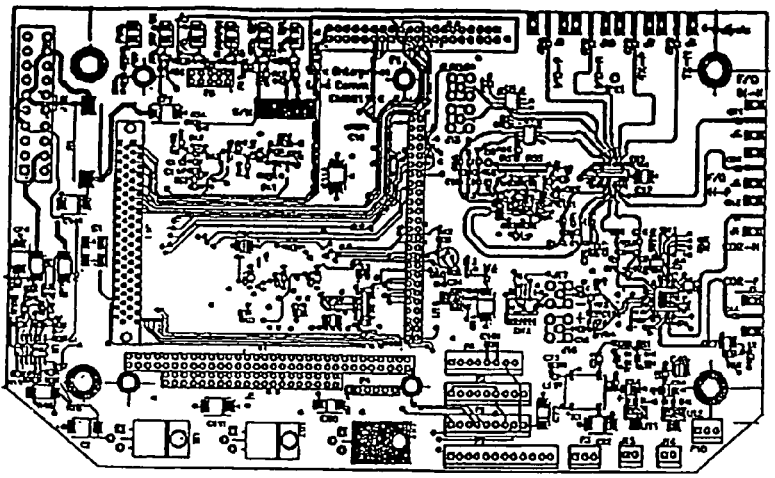
FIG. 19A  TOP
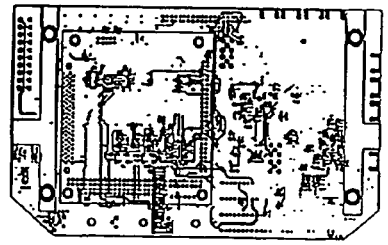
FIG. 19B  BOTTOM
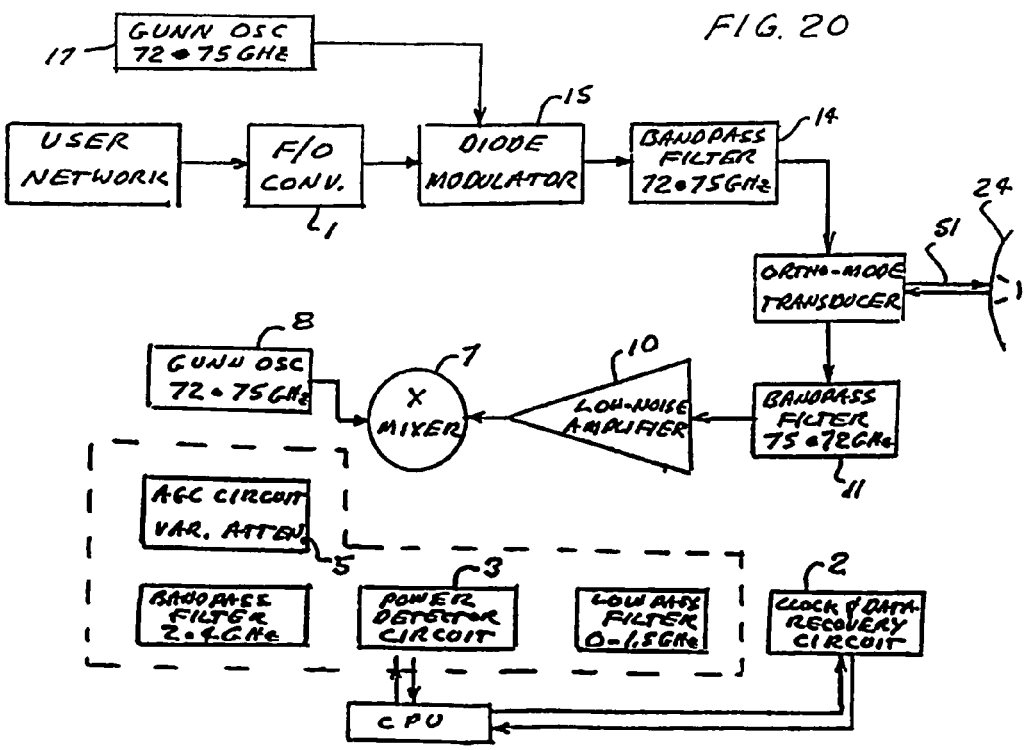
FIG. 20

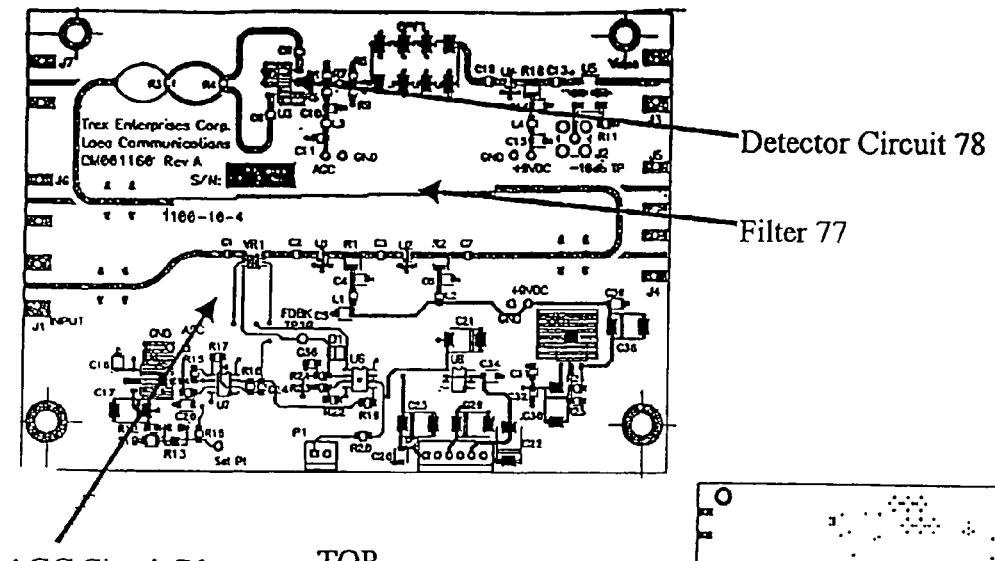
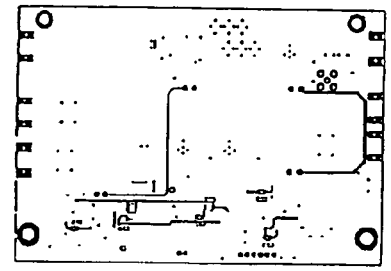
FIG. 21A — TOP
FIG. 21B — BOTTOM
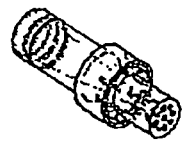
FIG. 22A
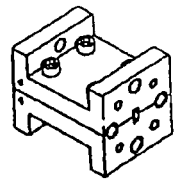
FIG. 23
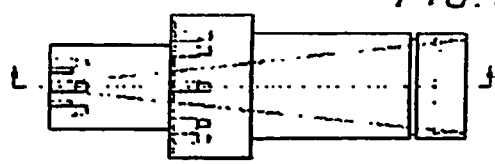
FIG. 22B
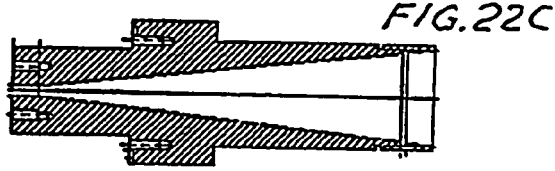
FIG. 22C
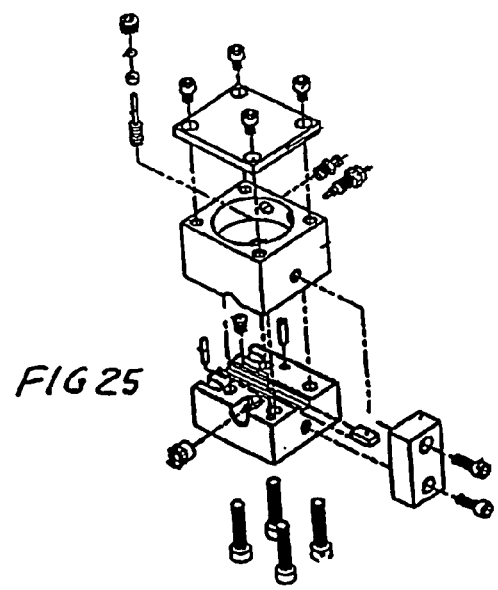
FIG 25

MOBILE MILLIMETER WAVE COMMUNICATION LINK

CROSS REFERENCE TO RELATED APPLICATIONS

This application is a continuation-in-part application of Ser. No. 10/046,348 filed Oct. 25, 2001 now abandoned which was a continuation-in-part application of Ser. No. 09/847,629 filed May 2, 2001, now U.S. Pat. No. 6,556,836, Ser. No. 09/872,542 filed Jun. 2, 2001 now abandoned, Ser. No. 09/872,621 filed Jun. 2, 2001 now abandoned, Ser. No. 09/882,482 filed Jun. 14, 2001 now U.S. Pat. No. 6,665,546, Ser. No. 09/952,591, filed Sep. 14, 2001 now U.S. Pat. No. 6,714,800, and Ser. No. 09/965,875 filed Sep. 28, 2001 now abandoned. This application is also a continuation in part of Ser. No. 10/061,872 filed Jan. 31, 2002 now abandoned, Ser. No. 10/127,886 filed Apr. 23, 2002 now abandoned, Ser. No. 10/196,486 filed Jul. 15, 2002, Ser. No. 10/319,058 filed Dec. 12, 2002 now U.S. Pat. No. 7,065,326, Ser. No. 10/799,225 filed Mar. 12, 2004 now U.S. Pat. No. 7,062,293 and Ser. No. 10/859,006 filed Jun. 2, 2004 now abandoned. All of the above applications are incorporated herein by reference.

FEDERALLY SPONSORED RESEARCH

This invention was made in the course of performance of a research contract for the United States Government and the Government has rights in the invention.

FIELD OF THE INVENTION

The present invention relates to millimeter wave communication systems and especially to such systems on mobile platforms.

BACKGROUND OF THE INVENTION

Wireless Communication Point-to-Point and Point-to-Multi-Point Wireless communications links, using portions of the electromagnetic spectrum, are well known. Most such wireless communication at least in terms of data transmitted is one way, point to multi-point, which includes commercial radio and television. However there are many examples of point-to-point wireless communication. Mobile telephone systems that have recently become very popular are examples of low-data-rate, point-to-point communication. Microwave transmitters on telephone system trunk lines are another example of prior art, point-to-point wireless communication at much higher data rates. The prior art includes examples of point-to-point laser communication at infrared and visible wavelengths.

Need for High Volume Information Transmission

The need for faster (i, e., higher volume per unit time) information transmission is growing rapidly. Today and into the foreseeable future the growing portion of transmission of information is and will be digital with volume measured in bits per second. To transmit a typical telephone conversation digitally utilizes about 5,000 bits per second (5 Kbps). Typical personal computer modems connected to the Internet operate at, for example, 56 Kbps. Music can be transmitted point to point in real time with good quality using mp3 technology at digital data rates of 64 Kbps. Video can be transmitted in real time at data rates of about 5 million bits per second (5 Mbps). Broadcast quality video is typically at 45 or 90 Mbps. Companies (such as telephone and cable companies) providing point-to-point communication services build trunk lines to serve as parts of communication links for their point-to-point customers. These trunk lines typically carry hundreds or thousands of messages simultaneously using multiplexing techniques. Thus, high volume trunk lines must be able to transmit in the billion bits per second (Gigabits per second, or Gbps) range. Most modern trunk lines utilize fiber optic lines. A typical fiber optic line can carry about 2 to 10 Gbps and many separate fibers can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months especially if the route is over private property or produces environmental controversy. Often the expected revenue from the potential users of a particular trunk line under consideration does not justify the cost of the fiber optic trunk line. Digital microwave communication has been available since the mid-1970's. Service in the 18-23 GHz radio spectrum is called "short-haul microwave" providing point-to-point service operating between 2 and 7 miles and supporting between four to eight T1 links (each at 1.544 Mbps). Microwave systems operation in the 11 to 38 GHz band have reportably been designed to transmit at rates up to 155 Mbps (which is a standard transmit frequency known as "OC-3 Standard") using high order modulation schemes. New unlicensed microwave systems operating in the 2.4 GHz or 5.8 GHz, 24 GHz, and 60 GHz bands also offer data rates up to 100 Mbps and higher.

Data Rate vs. Frequency

Bandwidth-efficient modulation schemes allow, as a general rule, transmission of data at rates of 1 to 10 bits per Hz of available bandwidth in spectral ranges including radio wave lengths to microwave wavelengths. Data transmission requirements of 1 to tens of Gbps thus would require hundreds of MHz of available bandwidth for transmission. Equitable sharing of the frequency spectrum between radio, television, telephone, emergency services, military and other services typically limits specific frequency band allocations to about 10% fractional bandwidth (i.e., range of frequencies equal to about 10% of center frequency). AM radio, at almost 100% fractional bandwidth (550 to 1650 KHz) is an anomaly; FM radio, at 20% fractional bandwidth, is also atypical compared to more recent frequency allocations, which rarely exceed 10% fractional bandwidth.

Reliability Requirements

Reliability typically required for wireless data transmission is very high, consistent with that required for "hard-wired" links including fiber optics. Typical specifications call for error rates less than one bit in ten billion ($10^{-10}$ bit-error rates), and link availability of 99.99% to 99.999% (about 50 minutes to 5 minutes of down time per year). This necessitates nearly all-weather link operability, in fog and snow, and at rain rates up to 100 mm/hour in many areas.

Weather Conditions

Weather-related attenuation limits the useful range of wireless data transmission at all wavelengths shorter than the very long radio waves. Typical ranges in a heavy rainstorm for optical links (i.e., laser communication links) are 1000 meters and for microwave links, 10,000 meters.

Atmospheric attenuation of electromagnetic radiation increases generally with frequency in the microwave and millimeter-wave bands. However, excitation of rotational transitions in oxygen and water vapor molecules absorbs radiation preferentially in bands near 60 and 118 GHz (oxygen) and near 23 and 183 GHz (water vapor). With rain, which attenuates through large-angle scattering, attenuation increases monotonically with frequency from 3 to nearly 200 GHz. At the higher, millimeter-wave frequencies, (i.e., 30 GHz to 300 GHz corresponding to wavelengths of 1.0 centimeter to 1.0 millimeter) where available bandwidth is highest, rain attenuation in very bad weather limits reliable wireless link performance to distances of a few miles or less. At microwave frequencies near and below 10 GHz, link distances to 10 miles can be achieved even in heavy rain with high reliability, but the available bandwidth is much lower.

Communication Antennas at Low Frequencies

At frequencies below about 3 GHz, antennas of practical size are nearly omni-directional, so beams from different antennas interfere, and the only equitable way to share the airwaves is by parceling the frequency spectrum. Licensees for a given spectrum band are auctioned to a single service provider in each geographical area, thereby eliminating competition in that area. To guarantee efficient use of the spectrum, bandwidth efficiency is mandated in this range of the radio spectrum and the licenses are required to limit the power of their transmissions so as to not interfere with communication at the same frequencies in other geographical areas.

Low Millimeter Wave Frequencies

At higher frequencies from about 3 to 60 GHz, antenna beams become somewhat directional, so beam interference can be avoided spatially. Here point-to-point licenses may be granted for services overlapping in frequency but not in space, or for services overlapping in space but not in frequency. The two-dimensional coordination afforded in this spectral range increases the number of licensees who can coexist in a given geographical area, allowing for increased competition.

Higher Millimeter Wave Frequencies

At frequencies above 60 GHz, antennas of practical size can generate highly directional "pencil beams" which do not interfere at all, because of their extremely limited spatial extent. A typical dish antenna of two-foot diameter operating at 75 GHz projects a half-power beam width of about 0.4 degrees providing a gain of about 51 dB. (Gain is the ratio of the radiation intensity in a desired direction compared to the radiation from a lossless, isotropic antenna with the same input power. The ratio is usually expressed in decibels.)

Dish Antennas

Most antennas used for high-gain applications utilize a large parabolic primary collector in one of a variety of geometries. In a prime-focus antenna the receiver is placed directly at the focus of the parabola. In a Cassegrain antenna a convex hyperboloidal secondary reflector is placed in front of the focus to reflect the focus back through an aperture in the primary to allow mounting the receiver behind the dish. (This is convenient since the dish is typically supported from behind.) An offset parabola rotates the focus away from the center of the dish for less aperture blockage and improved mounting geometry.

The required surface tolerance on the dish of a high quality conductive parabola antenna is about 15 thousandths of an inch (15 mils) for microwave applications (below 40 GHz), but closer to 5 mils for higher millimeter wave communications (57-100 GHz). Molded composites have achieved 5-mil tolerances, but are inherently quite expensive. Typical hydroformed aluminum dishes are inexpensive but cannot achieve surface tolerances needed for best performance for higher millimeter wave applications. The secondary reflector in the Cassegrain geometry is a small, machined aluminum "lollipop" which can be made to 1-mil tolerance without difficulty. Mounts for secondary reflectors and receiver waveguide horns preferably comprise mechanical fine-tuning adjustment for in-situ alignment on an antenna test range.

Coarse and Fine Pointing

Pointing a high-gain antenna normally requires coarse and fine positioning. Coarse positioning can be accomplished initially using a visual sight such as a bore-sighted rifle scope or laser pointer. The antenna is typically locked in its final coarse position prior to fine-tuning. The fine adjustment is performed with the remote transmitter turned on. A power meter connected to the receiver is monitored for maximum power as the fine positioner is adjusted and locked down. Any subsequent unintended displacement and/or rotation of the antenna due to thermal effects, wind loading, or any other external force may cause the antenna beam to wander off of the remote transmitter.

Prior Art Tracking Antennas

In a Cassegrain antenna, a rotating, slightly off-axis feed horn ("conical scan") can be used to steer the beam mechanically without moving the large primary dish. Also, for Cassegrain, prime focus or offset parabola antennas, a multi-aperture feed (e.g. quad-cell) can be used with a selectable switching array or a monopulse transceiver. In these dish architectures, beam tracking is based upon maximizing signal power or minimizing wave front tilt into the receiver. Using a common aperture or mounting structure for the receiver and transmitter antennas ensures that the transmitter and receiver are both pointed in the same direction. Flat panel antennas are also used for tracking and have been used extensively for radar tracking. One example is a flat-panel phased array antenna with a Rotman lens. In this antenna phased array beam combining from multiple output ports of the Rotman lens is used to steer the beam azimuthally over many antenna beam widths without mechanically rotating the antenna itself.

Trunk Lines

Trunk lines typically carry hundreds or thousands of messages simultaneously using multiplexing techniques. Thus, high volume trunk lines must be able to transmit in the gigabit (billion bits, Gbits) per second range. Most modern trunk lines utilize fiber optic lines. A typical fiber optic line can carry about 2 to 10 Gbits per second per wavelength and many separate fibers each carrying many separate wavelengths can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months especially if the route is over private property or produces environmental controversy. Often the expected revenue from the potential users of a particular trunk line under consideration does not justify the cost of the fiber optic trunk line.

The Need

High Speed Communication with Moving Platforms

A need exists for high-speed wireless communications to and from moving platforms. For instance, reconnaissance aircraft (including unmanned aerial vehicles) may generate large volumes of video and other sensor data which needs to be transferred to users on the ground with a high-speed downlink. In other applications, such as ship-to-ship communications, ship-to-shore communications, aircraft-to-aircraft, aircraft-to-satellite, satellite-to-satellite and satellite-to-ground communications, full duplex links may be needed, either alone or as part of a larger network. Current state of the art mobile communications links using radio frequency (RF) or microwave communications have fairly loose pointing tolerances, but tend to be limited in data rate to speeds of 45 Megabits per second (Mbps) or less. Current state of the art communications using lasers can support higher data rates of 1.25 Gibabits per second (Gbps) and higher in good weather, but perform poorly in adverse weather conditions. These systems typically use narrow beams with divergences on the order of 0.1 degrees or less, and thus laser link transceivers must be pointed very accurately, which is challenging on a moving platform.

SUMMARY OF THE INVENTION

The present invention provides a point-to-point, wireless, millimeter wave communications link between two stations at least one of which is a mobile station. A millimeter wave transmitter system operates on the mobile station at frequencies higher than 57 GHz with a tracking antenna producing a beam having a half-power beam width of about 2 degrees or less. A millimeter wave receiver system operates on the second station, also with a tracking antenna having a half-power beam width of about 2 degrees or less. In preferred embodiments each mobile station has a global positioning system (GPS) and a radio transmitter and both tracking antennas are pointed utilizing GPS information from the mobile station or stations. The GPS information preferably is transmitted via a low frequency, low data rate radio. Each millimeter wave unit is capable of transmitting and/or receiving, through the atmosphere, digital information to/from the other station at rates in excess of 155 million bits per second during normal weather conditions. In preferred embodiments actually built and tested by applicants digital information has been transmitted at rates of 1.25 gigabits per second.

Preferred communication links described here are millimeter wave links operating at frequencies of 71-73 GHz and 74-76 GHz mounted on simple two-axis gimbals. Pointing information of the required accuracy is provided by GPS receivers and standard radio links which send the GPS calculated positions to the millimeter wave systems at the opposite end of the link. In these embodiments there is no need for any complicated closed loop pointing information derived from received signal intensity or phase. On moving platforms locally generated inertial attitude information is combined with the GPS positions to control pointing of the gimbaled transceivers.

BRIEF DESCRIPTION OF THE DRAWINGS

FIG. 5 is a block diagram of the aircraft transceiver of an aircraft to ground link.
FIG. 6 is a block diagram of the ground transceiver of the aircraft to ground link.
FIGS. 17 and 18 show the I/O circuit board 70.
FIGS. 19A and B show signal conditioning & clock recovery circuit board 71.
FIG. 20 shows a block diagram of a millimeter-wave communications transceiver.
FIGS. 21A and B show an IF circuit board 80.
FIGS. 22A, 22B and 22C show details of a feed-horn 51.
FIG. 23 shows a detail of band-pass filters 11, 14, and 19.
FIG. 25 shows a detail of Gunn oscillators 8 and 17.

DETAILED DESCRIPTION OF PREFERRED EMBODIMENTS

Figure 3:
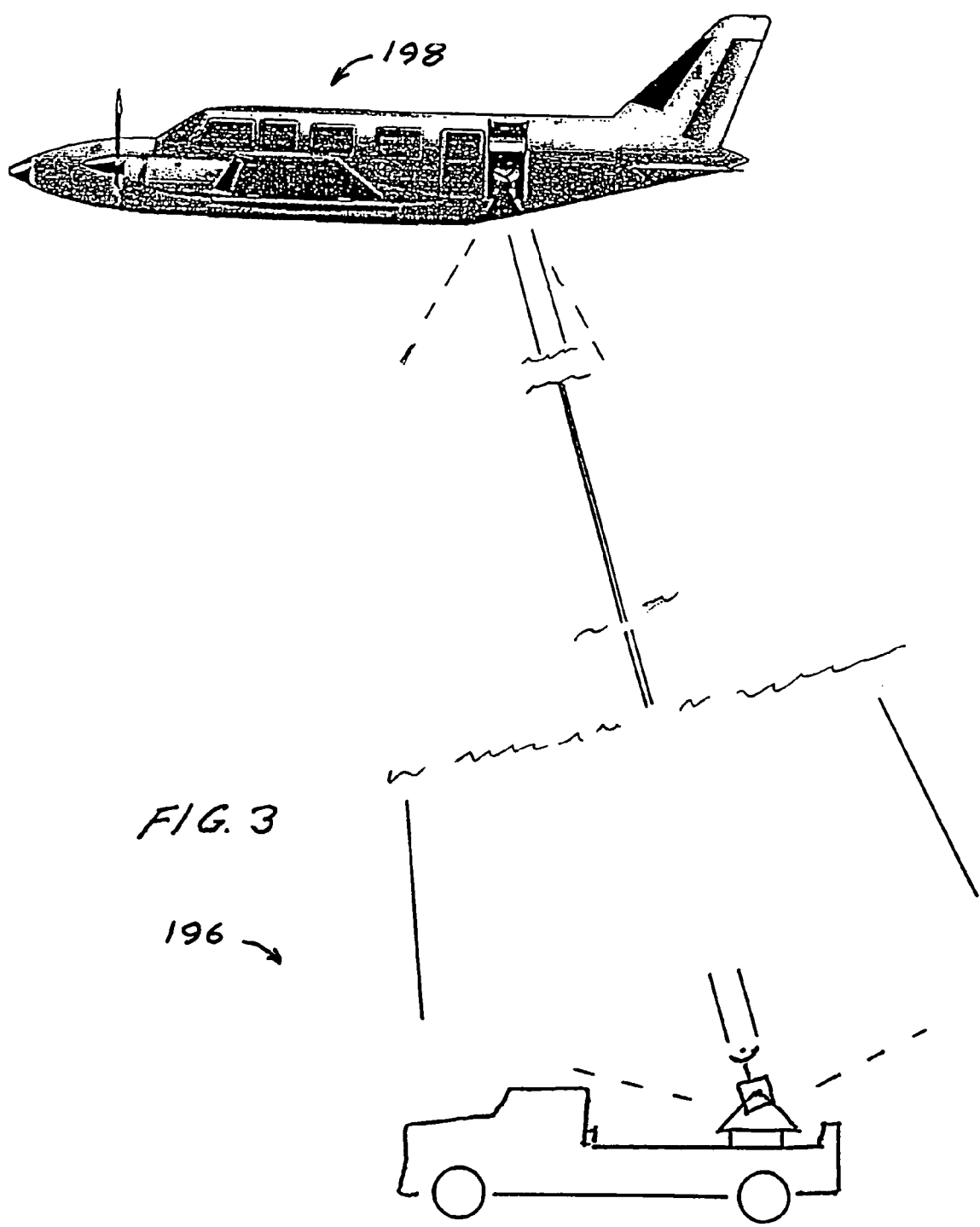
FIG. 3 shows a mobile ground to aircraft link.

First Preferred Embodiment Mobile Air to Stationary Ground Platform Important antenna pointing features of a first preferred embodiment of the present invention are shown in FIGS. 2 and 3 and 5 through 8. This embodiment represents a prototype demonstration carried out by Applicants to prove many of the advantages of the present invention. It is a mobile-to-stationary link, specifically a mobile aircraft station 198 to stationary ground station 196 as shown in FIG. 3. A view of the aircraft gimbaled transceiver looking out the aircraft window is in FIG. 2. The main components of the gimbaled aircraft transceiver are shown in the FIG. 5 block diagram and the main components of the gimbaled ground transceiver are shown in FIG. 6. The aircraft is a Piper Navajo PA31-350 and the regular luggage door was replaced with a door fabricated from Plexiglas that is about 90 percent transparent to millimeter wave radiation. The aircraft transceiver system 200 (FIG. 5) includes a 12 inch antenna 202A mounted on an off the shelf gimbal unit 204A (Model MAPS 300 available from Codem Systems Inc, with offices in Merrimack, N.H.). A millimeter wave transmitter/receiver unit 206A is mounted behind antenna 202A. The aircraft transceiver system also includes RF modem 208A which operates at a frequency of 900 MHz and transmits to ground station 196 GPS position data provided by GPS unit 210A. The aircraft transceiver system 200 includes inertial reference sensor 212 of a type available from Aplarin Corp, with offices in Richmond Hill, Ontario, Canada.

Transceiver system 200 also includes a Model VSBC6862 Power PC module 214A available from Actis Computer Inc. with offices in Tempe, Ariz. with module 214 programmed to point gimbal unit 204A to ground station 196 based on the GPS position of stations 196 and 198 and inertial reference sensor 212. As shown in module 214 the system also includes a 1.25 gigabit Ethernet data connection 215A providing input and output for transmittal of data between aircraft station 198 and ground station 196.

Ground station components shown in FIG. 6 include similar components specifically 24 inch antenna 202B mounted on gimbals 204B (PN: 134450 available from Rotating Precession Mechanisms Inc. with offices in Northridge, Calif.). As in the aircraft, millimeter wave transceiver-receiver unit 206B is mounted on the back of antenna 202B. Other components are also similar.

Figure 7:
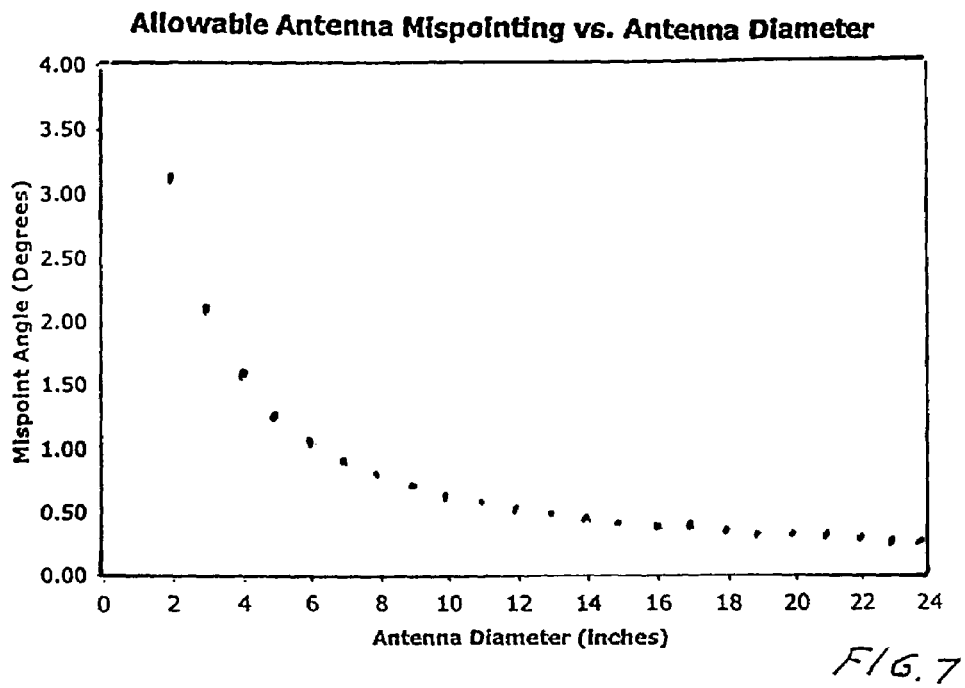
FIG. 7 is a graph of allowable antenna mispointing vs. antenna diameter.

For their data link from an aircraft to the ground, applicants use millimeter wave transceivers designed with different divergences. On the aircraft, it is desirable to use a relatively smaller antenna (to minimize weight and volume) and to have a relatively larger beam divergence (to minimize angular pointing tolerances as the aircraft moves and vibrates). On the ground, however, a larger antenna with narrower divergence and tighter pointing requirements can be used with little penalty. The divergence from a millimeter wave transceiver is a function of the millimeter wave frequency and the antenna diameter. In this demonstration applicants use a 12-inch antenna in the aircraft and a 24-inch antenna in the ground station. The optimum link budget system design in the presence of random mispointing occurs when the maximum allowable mispointing angle (before reaching the link budget threshold) corresponds to the angle where the beam intensity falls to 1/e of its value on axis. FIG. 7 shows this maximum allowable antenna mispointing angle as a function of antenna diameter assuming a millimeter wave frequency of 73 GHz. A system with a 12 inch diameter antenna can tolerate a mispointing angle of 0.5 degrees. The reader should note that this mispointing angle is much larger than what would normally be required for a laser communications system.

Figure 8:
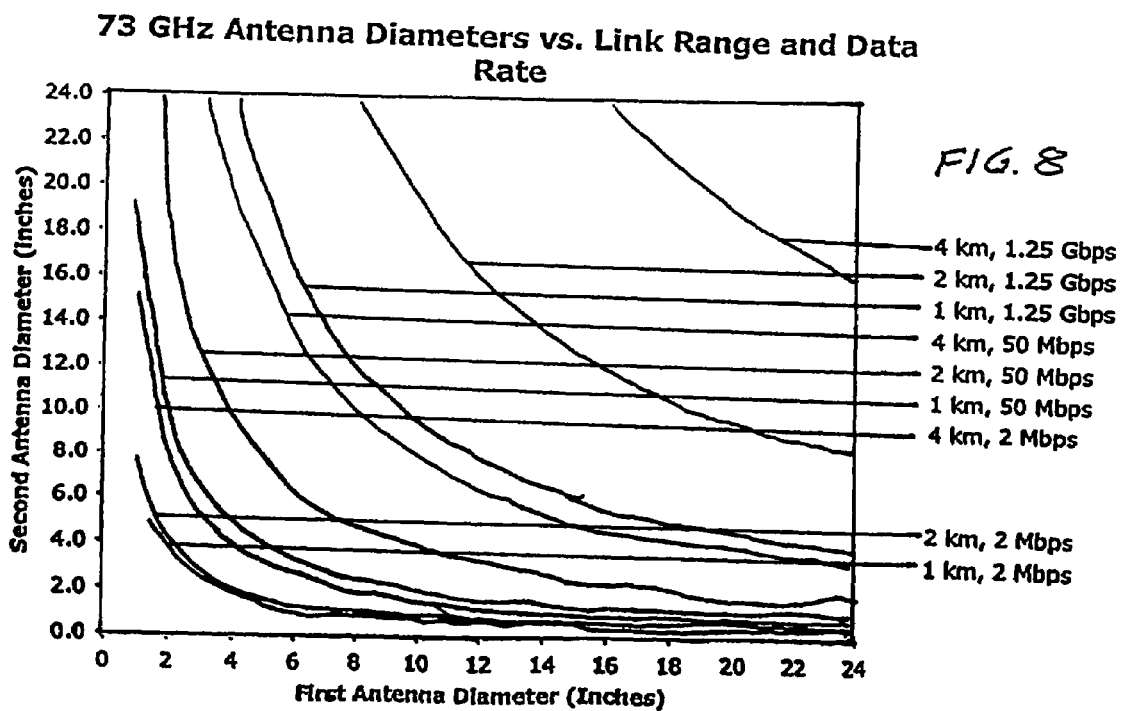
FIG. 8 is a graph showing relationships between antenna size, range and data rate.

The achievable distance for a millimeter wave link through the air in clear weather depends on the power transmitted, the required receive power, the millimeter wave frequency, the size of the antennas, and the amount of mispointing at the two ends of the link. Current millimeter wave communications equipment (for instance, the Loea 2000 manufactured by Loea Corporation headquartered in Kihei, Maui, Hawaii) has a transmitted power of around 20 mW, has a minimum receive power requirement of around 100 nW at 1.25 Gbps (scaling proportional to the data rate), and a wavelength of 4.1 mm (73 GHz frequency). Assuming a 1/e divergence of 1.25*wavelength/antenna diameter, and a maximum mispointing of each antenna to its 1/e divergence (4.3 dB loss at each end), the required diameter of one antenna as a function of the diameter of the other antenna can be calculated for different link distances and data rates. The results of this calculation are shown in FIG. 8. For example, for a data rate of 1.25 Gbps and a link distance of 2 km, if one of the antennas has a diameter of 12 inches (on the aircraft, say), the other antenna (on the ground, say) should have a diameter of at least 16 inches. Alternatively, an 8 inch antenna could be used on the aircraft, with a 24 inch antenna on the ground. Use of a millimeter wave transceiver with a higher power, or a lower required receive power, would lead to longer distance capability or smaller required antenna sizes.

In preferred embodiments, the system on the aircraft will include sensors for generating data to be transferred (such as visible and infrared cameras, synthetic aperture radar, hyperspectral imaging sensors, etc.), and data storage to buffer the data.

The transceiver on the ground with the 24 inch diameter antenna has an allowable mispointing angle of about 0.25 degrees. At a distance of 1 km, this would correspond to a lateral offset of about 4.4 meters so that the beam approximately encompasses the aircraft. Assuming that uncertainty in the position of the aircraft is the limit to the pointing accuracy of the ground terminal, the ground terminal needs to have information about the position of the aircraft terminal that has an error of less than 4.4 meters. Therefore, the GPS system on the aircraft (combined with averaged trajectory information) must have an accuracy better than this value. This is not a problem to achieve with the current state of the art. At a distance of 2 km, the required tolerance on GPS accuracy will be commensurately larger (less than 8.8 meters).

Calculating Pointing Angles Using GPS

Techniques for pointing antennas at moving transceivers based on GPS data have been developed for pointing radio and microwave antennas at satellites. See for example Pritchard, et al, Satellite Communication System Engineering, $2^{nd}$ ed., Prentice Hall pgs. 111-115. Applicants have adapted these techniques for pointing their narrower millimeter wave beam at moving targets. These techniques are summarized below:

Ground to Aircraft

The controller for the ground terminal as shown in FIG. 6 calculates the necessary pointing angle to the aircraft in the following steps:

1) Convert the aircraft GPS position (in latitude, longitude and altitude) received over radio link 208B to Earth Centered Fixed coordinates (x aircraft, y aircraft, and z aircraft).

2) Convert its own position (latitude, longitude and altitude) to Earth Centered Fixed coordinates (x ground, y ground, and z ground).

3) Calculate the difference between the Earth Center Fixed coordinates to determine an x, y, z vector from the ground to the aircraft. This vector has the form:

$\rho_x = x'_a - x'_g$ $\rho_a = y'_a - y'_g$ $\rho_z = z'_a - z'_g$

4) Convert the x, y, z pointing vector in the Earth Center Fixed coordinate system to a coordinate system centered on the ground terminal. This coordinate system is sometime called an "ENU" coordinate system (where East North and Up are positive directions). It is also referred to as a "topocentric coordinate system. The transformation to topocentric coordinates $(x_t, y_t, z_t)$ is given by:

$$\begin{pmatrix} x_t \\ y_t \\ z_t \end{pmatrix} = A \begin{pmatrix} \rho_x \\ \rho_y \\ \rho_z \end{pmatrix}$$

Where A is the rotation matrix:

$$A = \begin{pmatrix} \sin\phi_g \cos\lambda_g & \sin\phi_g \sin\lambda_g & -\cos\phi_g \\ -\sin\lambda_g & \cos\lambda_g & 0 \\ \cos\phi_g \cos\lambda_g & \cos\phi_g \sin\lambda_g & \sin\phi_g \end{pmatrix}$$

Therefore, $x_t = \sin\phi_g \cos\lambda_g \rho_x + \sin\phi_g \sin\lambda_g \rho_y - \cos\phi_g \rho_z$ $y_t = -\sin\lambda_g \rho_x + \cos\lambda_g \rho_y$ $z_t = \cos\phi_g \cos\lambda_g \rho_x + \cos\phi_g \sin\lambda_g \rho_y + \sin\phi_g \rho_z$ The slant range is then $d = \sqrt{\rho_x^2 + \rho_y^2 + \rho_z^2} = \sqrt{x_t^2 + y_t^2 + z_t^2}$ 5) Then the controller does a coordinate transformation to convert this vector into an azimuth and elevation pointing direction for the ground terminal, and commands the ground gimbal to point in that direction, aligning its receiver with the direction of signals from the aircraft transceiver. The azimuth and elevation angles are given by:

$$\tan Az = \frac{y_t}{x_t}$$

and $$\tan\theta = \frac{z_t}{\sqrt{x_t^2 + y_t^2}}$$

Aircraft to Ground

If the ground station is stationary as in this embodiment, the controller for the aircraft gimbals in this application is programmed in advance with the fixed coordinates of the ground station. Using a similar process to that described for the ground terminal, it would calculate an x,y,z vector in Earth Centered Fixed coordinates from the aircraft terminal to the ground terminal (which would just be the opposite of the vector calculated on the ground). Through a coordinate transformation, this vector would then be translated to a vector in the x', y', z' coordinate system of the aircraft gimbals after accounting for the attitude of the gimbals derived from the inertial reference system. This new vector would then correspond to a gimbals azimuth and elevation, which the controller would command the aircraft gimbals to point to. With the antenna on the aircraft transceiver having a diameter of 12 inches, only half of its pointing tolerance would be used up by the inaccuracy of the GPS position (if it was of the accuracy needed for the 24 inch antenna ground system), and the rest of the pointing tolerance could be allocated to inaccuracies in the inertial reference system and the pointing of the antenna in the presence of vibrations.

Mobile Platform to Mobile Platform

Figure 4:
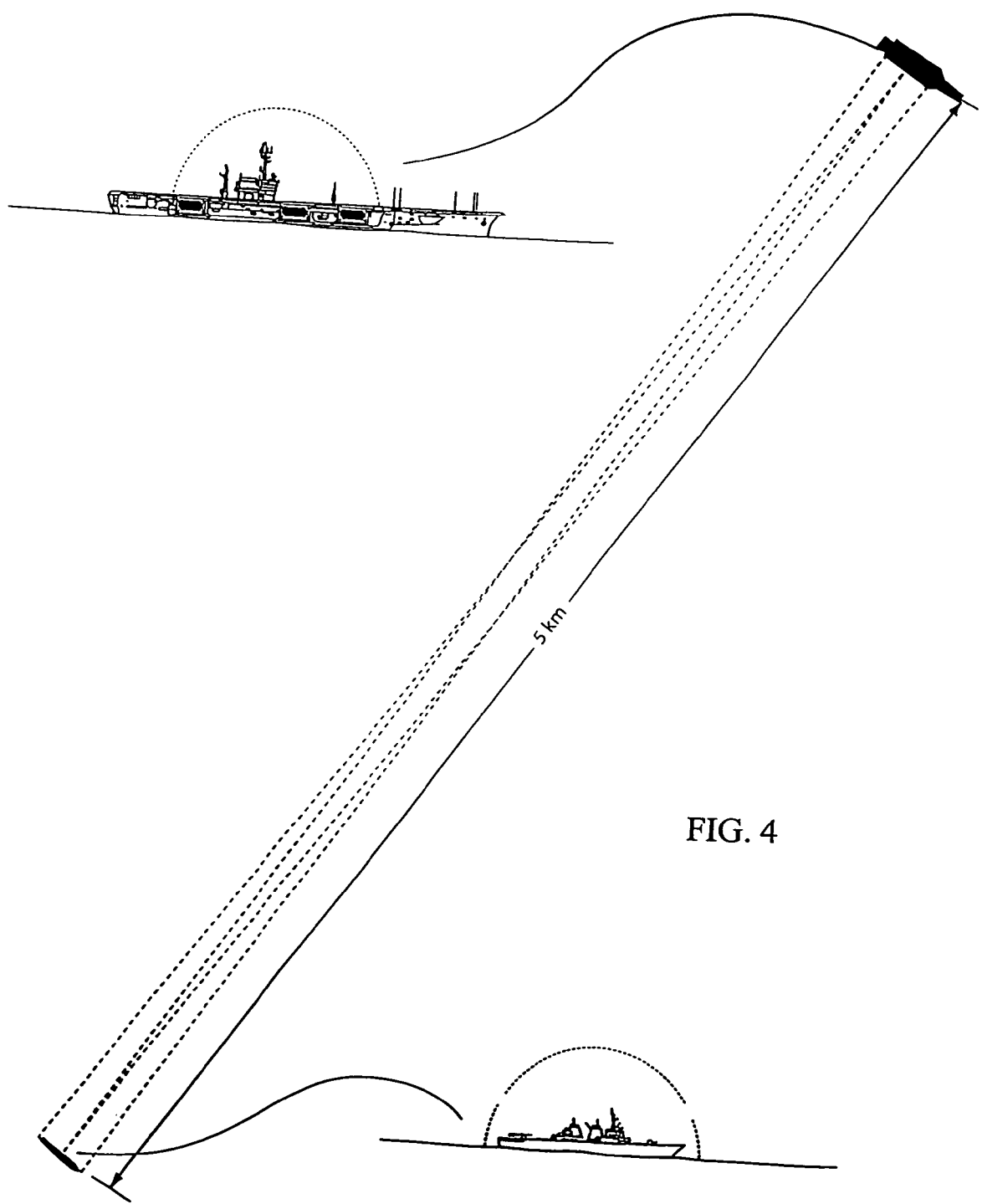
FIG. 4 shows a ship to ship link.

FIG. 4 shows features of mobile ship to mobile ship communications link. In this case, both platforms include a GPS system and a radio transmitter to send the GPS position to the transceiver at the other end of the link. Both systems also need an inertial reference sensor. FIG. 3 shows features of a mobile ground to mobile air link.

Millimeter Wave Radios

The most important feature of this invention is the millimeter wave radios operating at frequencies above 57 GHz and, more specifically, above 70 GHz. Applicants were the first to demonstrate the feasibility of these radios operating above 70 GHz and they have been described in the parent patent applications listed in the first paragraph of this application. Some of these radios and the programs of the development of these radios are discussed in the following sections of this patent application. Tracking techniques were proposed in those applications primarily for the purpose of maintaining alignment between stationary stations. However, these techniques can be applied for fine alignment in the case of one or two mobile stations where GPS is used for course alignment.

Beam Steering

In one of the grandparents to this case (Ser. No. 09/847,629), now U.S. Pat. No. 6,556,836 issued Apr. 29, 2003, the Applicants disclosed:

"Phased-array beam combining from several ports in the flat-panel phased array could steer the beam over many antenna beam widths without mechanically rotating the antenna itself. Sum-and-difference phase combining in a mono-pulse receiver configuration locates and locks on the proper "pipe." In a Cassegrain antenna, a rotating, slightly unbalanced secondary ("conical scan") could mechanically steer the beam without moving the large primary dish. For prime focus and offset parabolas, a multi-aperture (e.g. quad-cell) floating focus could be used with a selectable switching array. In these dish architectures, beam tracking is based upon maximizing signal power into the receiver. In all cases, the common aperture for the receiver and transmitter ensures that the transmitter, as well as the receiver, is correctly pointed."

These alignment techniques were further discussed in other parent patent applications.

Cassegrain Monopulse Tracking Antenna

Figure 9:
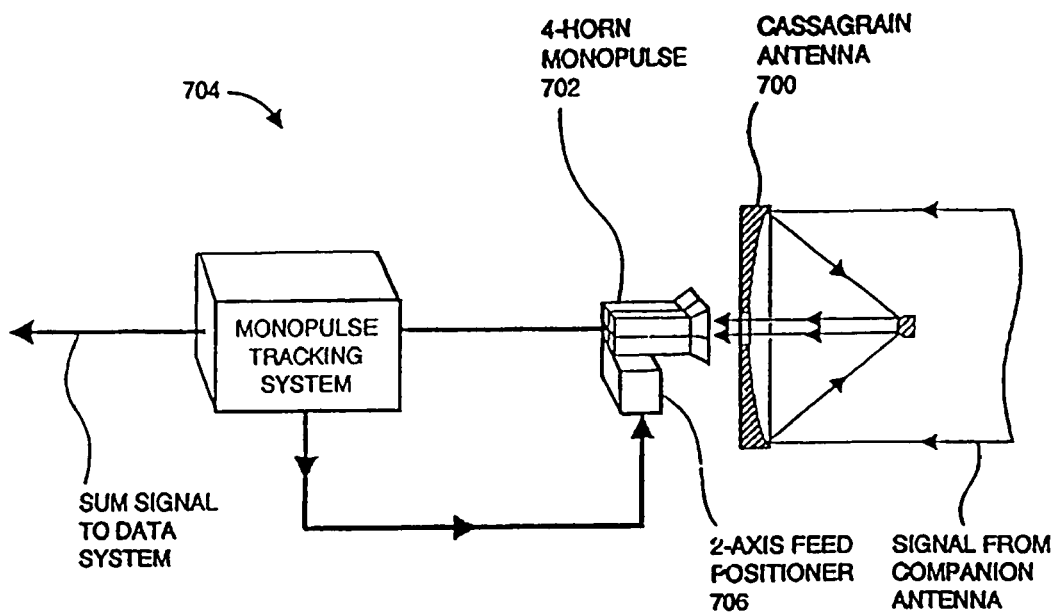
FIGS. 9, 10 and 11 describe elements of a preferred embodiment of the present invention.
Figure 10:
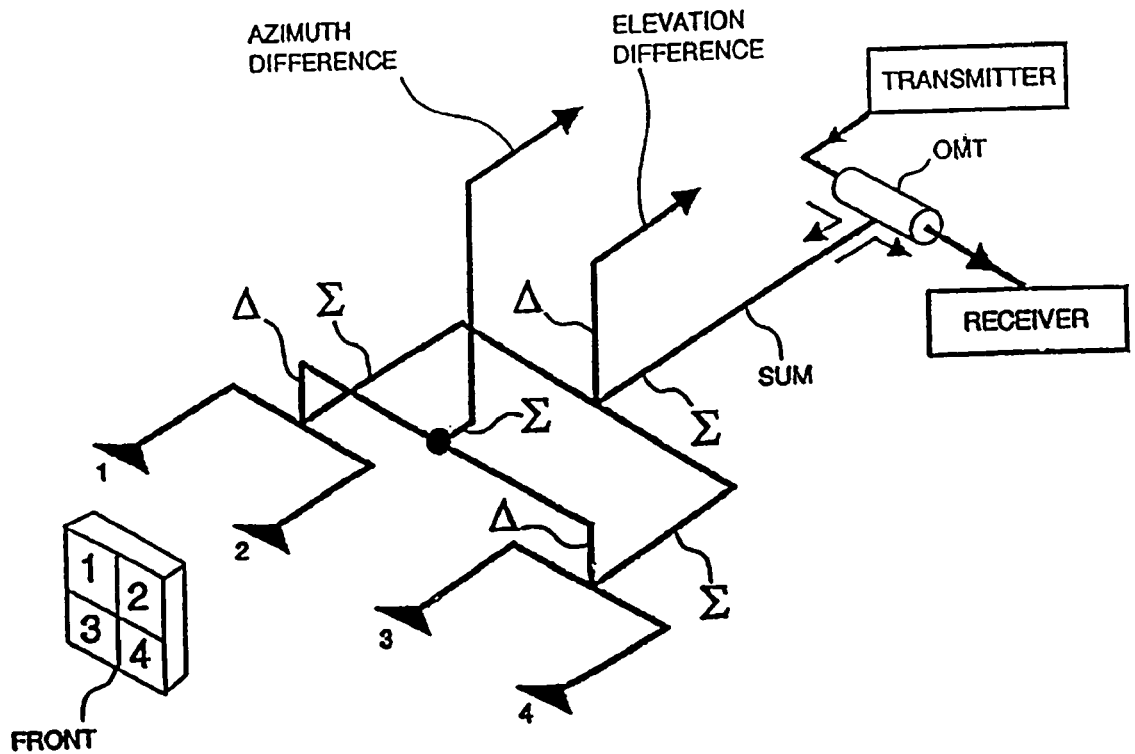
Figure 11:
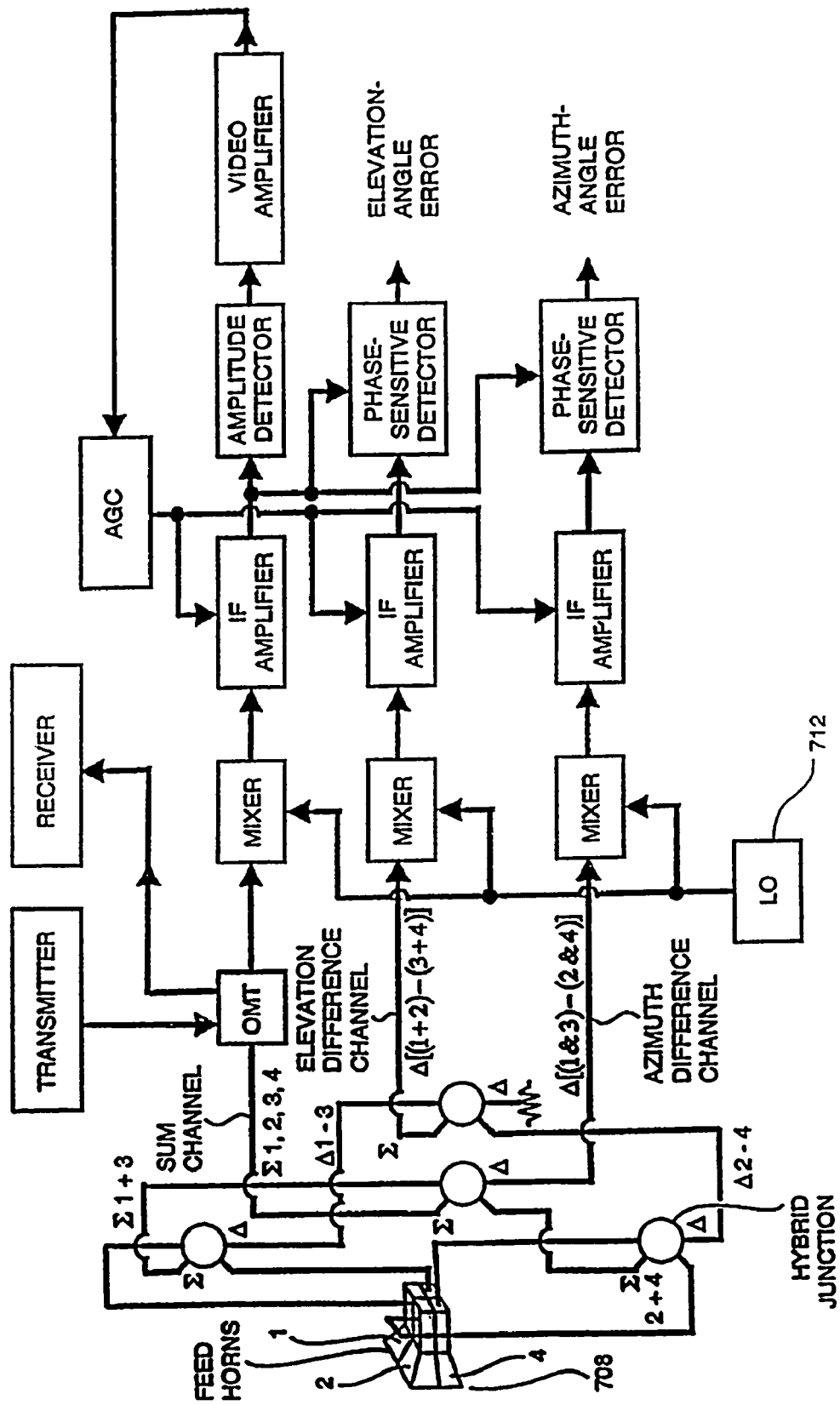
Figure 12:
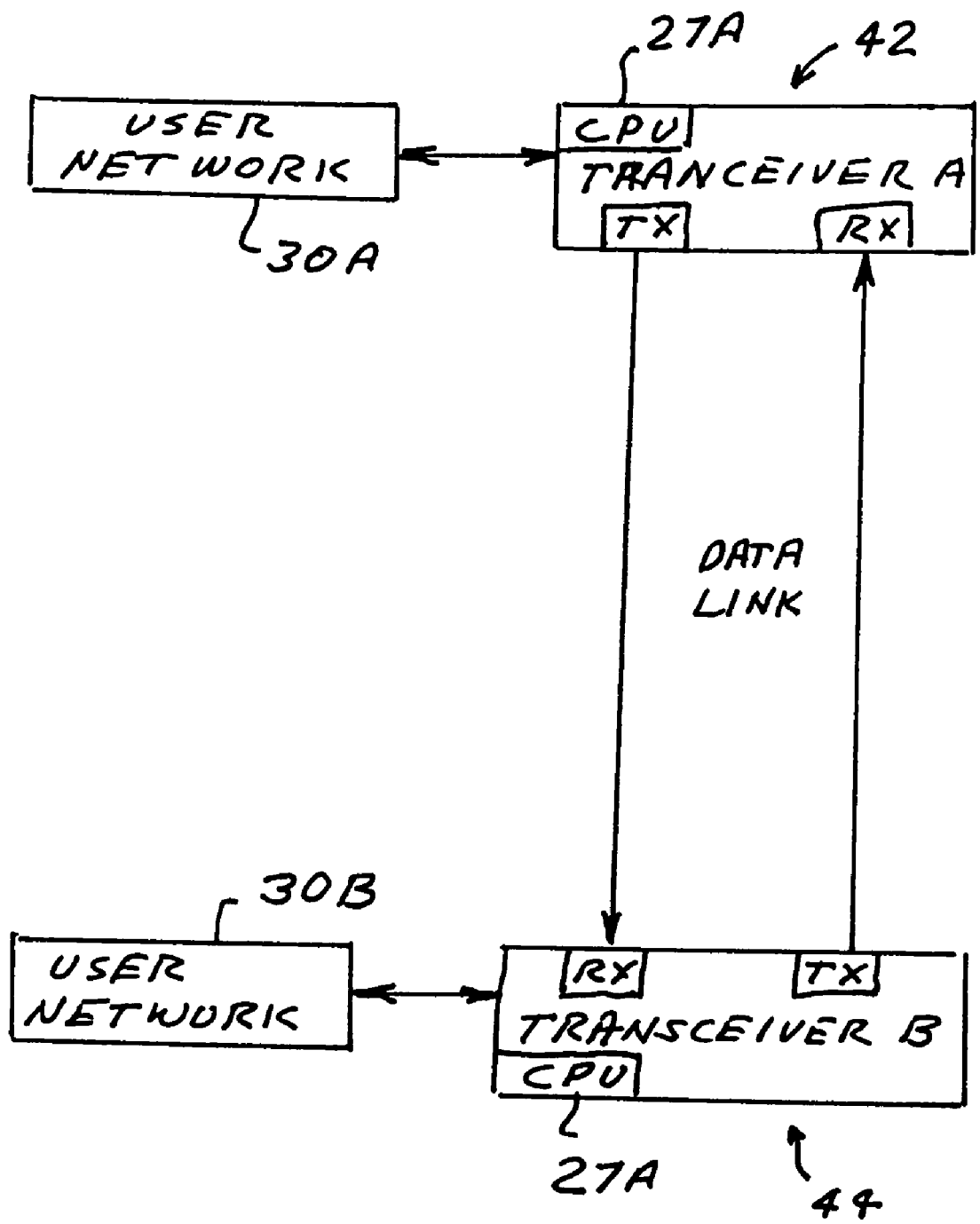
FIGS. 12 and 13 show how millimeter wave transceivers connect to user networks.
Figure 13:
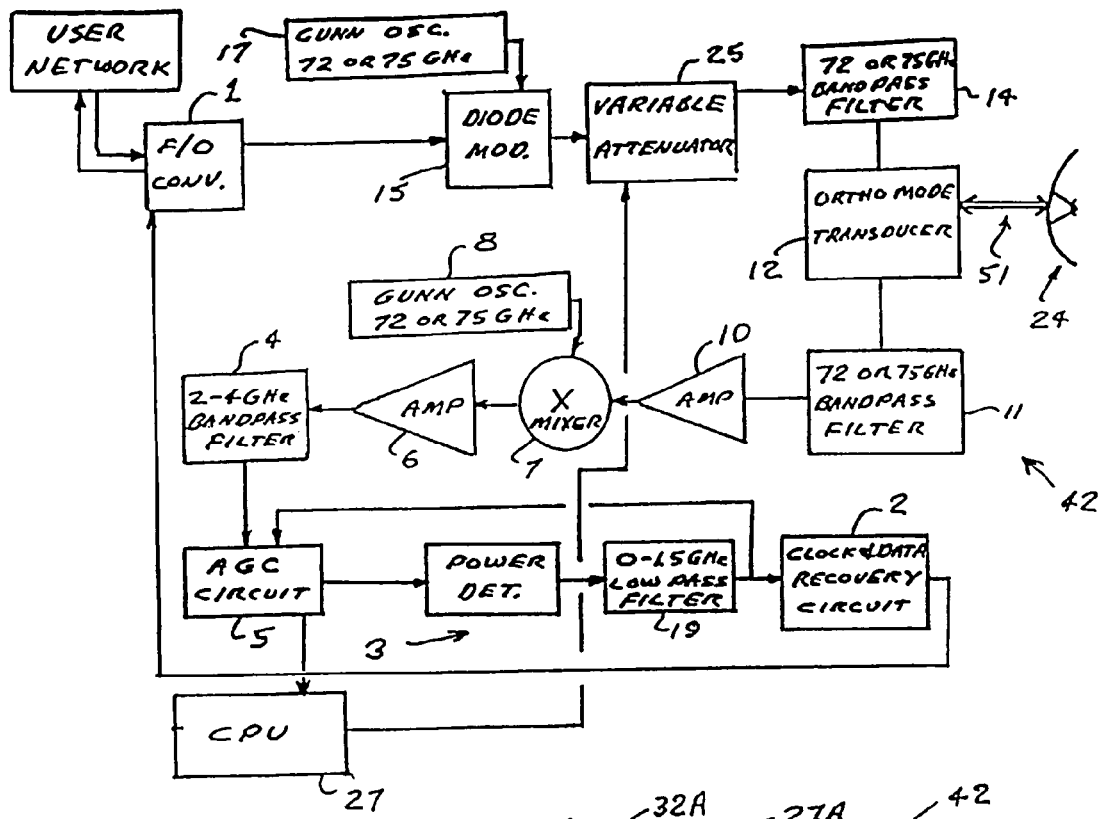

In a preferred embodiment to provide end-user high-gain the antenna is a tracking Cassegrain antenna using monopulse tracking as shown in FIGS. 9, 10 and 11. FIG. 9 shows the principal elements of the antenna system. Cassegrain antenna 700 is utilized with a four horn feed 702 which is a part of a monopulse tracking system 704 similar to monopulse tracking systems used for radar applications which are discussed in the Background section. The antenna system comprises a two-axis positioner 706 for the four horn feed which adjusts the four-horn feed in azimuth and elevation based on monopulse information as described below in order to keep it at all times pointed directly at a companion antenna with which it is communicating. As described below, communication (both transmit and receive) is through a four-horn sum signal that is provided to the four-horn feed 702.

FIG. 10 shows how signals are applied to and received from the four horns 702 to both communicate and to point the antenna beam. The positions of each of the four horns are shown at 708. The figure shows how the sum signals and the difference signals are extracted from the wave-guides feeding the horns. The figure also shows how an orthomode transceiver is used to both transmit and receive through the sum signal from the wave-guides.

FIG. 11 provides a more detailed layout of the monopulse tracking system. The system uses a single local oscillator 712, mixers 714, amplifiers 716, detectors 718 and automatic gain control 720 which is typical in monopulse radar tracking.

As is true for the planar phased array, when appropriate time delay is added to null out differential amplitude in the four receiver channels, a transmitter propagating source power back to the antenna through the same paths and delays is guaranteed to radiate out precisely toward the remote transceiver.

Other Tracking Dish Antennas

Other tracking techniques for keeping the pencil beam aligned can be used. One alternative is the conical scan technique that is another well known technique used for radar scanning. A good explanation of this scanning technique is provided in Introduction to Radar Systems by Merriss I Skolnik, McGraw-Hill, Pages 155-159. Those techniques for scanning the radar beam can be adapted to communication using the same techniques discussed above for the monopulse approach. Another approach is the sequential lobing also described in the above reference. It too could be adapted to keep the communication antennas aligned using the concepts described above.

In addition to the Cassegrain, other dish-type antennas could be used for tracking with the monopulse technique as described above. And these other types of antennas could also be used with the other scanning techniques. Some of these other antenna types are discussed below under the heading "Narrow Beam Width Antennas".

Preferred Transceiver Units

Figure 14:
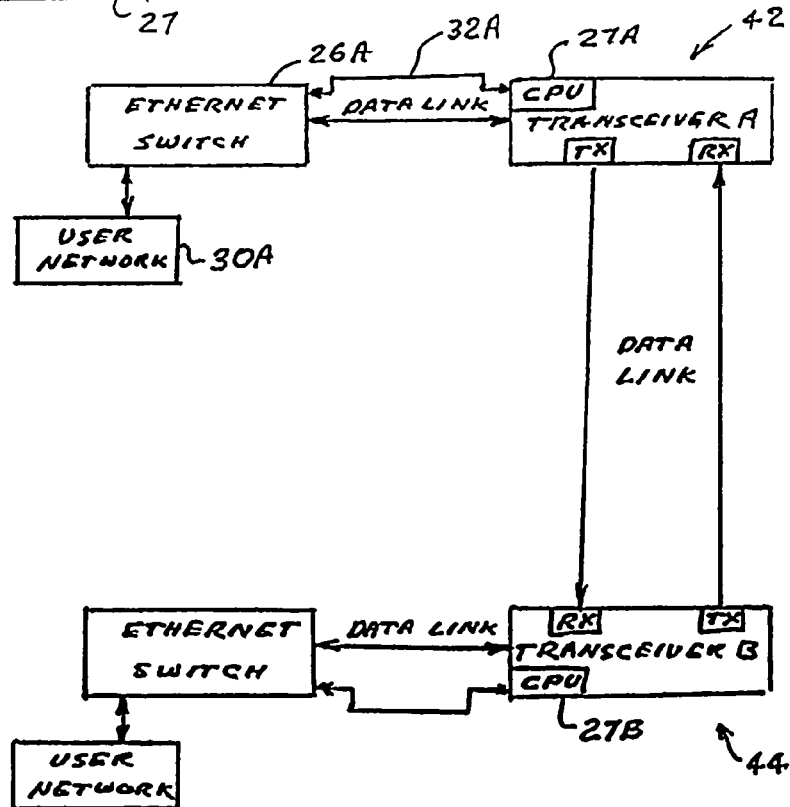
FIG. 14 shows the block diagram of a data link in which an Ethernet switch is used at each end of the link to combine and extract radio CPU data with other external user data.
Figure 15:
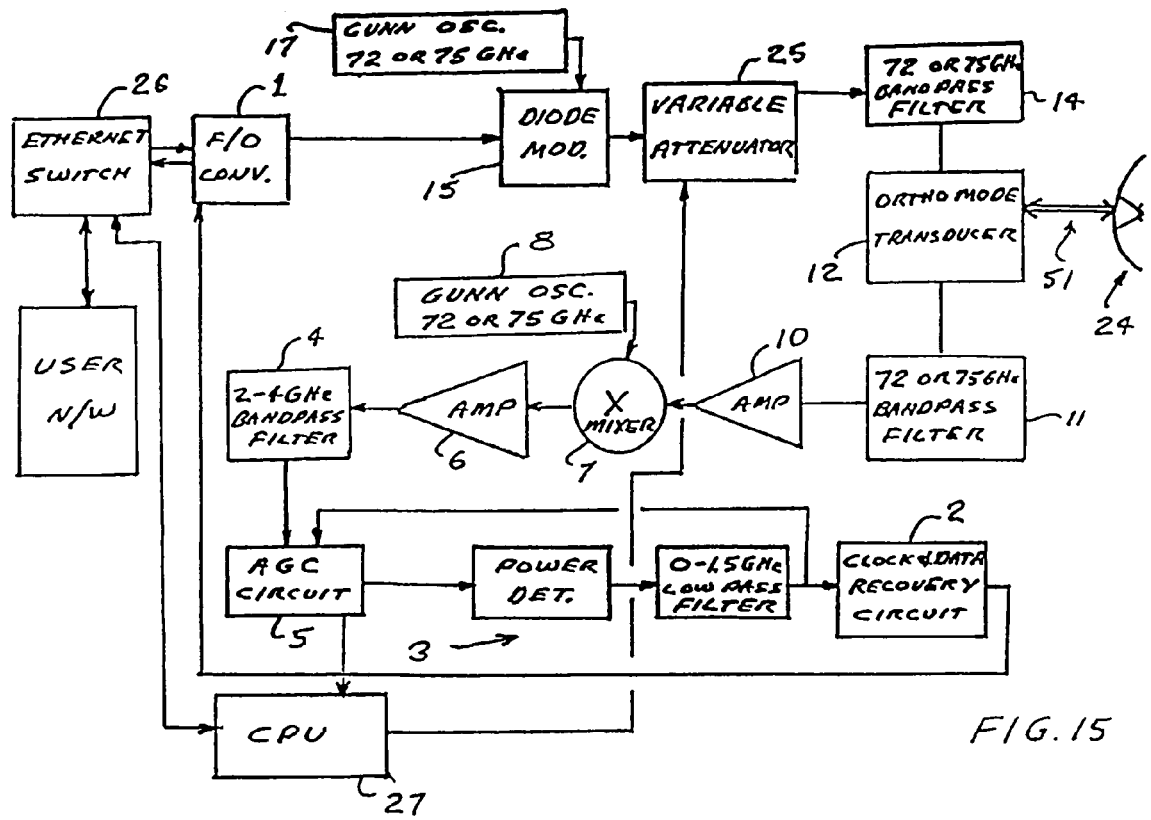
FIG. 15 shows a block diagram of a radio in which an Ethernet switch is used to combine and extract data from the data stream being passed over the link.
Figure 16:
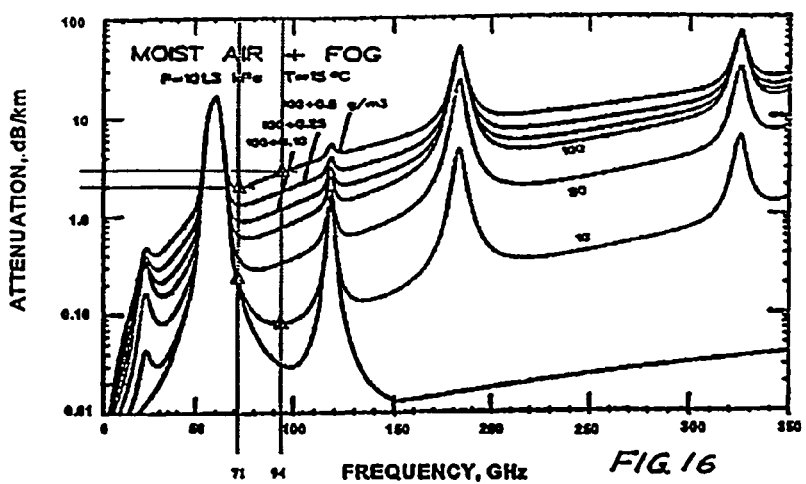
FIG. 16 shows atmospheric attenuation as a function of frequency for millimeter-wave frequencies, at various levels of relative humidity.

In radios built and tested by Applicants, a millimeter-wave data link is configured to pass Ethernet data packets bi-directionally between the ends of the link. A block diagram of the data link is shown in FIG. 14. A block diagram of the millimeter-wave transceiver used at each end of the link is illustrated in FIG. 15. One end of the link 42 (designated as "Transceiver A") transmits at 72 GHz and receives at 75 GHz, and the other end 44 (designated as "Transceiver B") transmits at 75 GHz and receives at 72 GHz. A dish antenna 24 with a diameter of 2 feet is used at the stationary end to achieve a received beam width of approximately 0.34 degrees, and an antenna 24 with a diameter of 1 foot is used at the mobile end to achieve a radioed beam width of approximately 0.68 degrees.

FIG. 15 shows a block diagram of one of the transceivers. The reader should note that FIG. 15 represents both ends of the link since they are identical except for local oscillator frequency and antenna size, and the A's and B's in FIG. 15 have been dropped in the references to the components. The transceivers are described in detail below. The readers should also note that for a unidirectional link (for instance from an aircraft to the ground), only the transmit circuitry would be used at one end, and only the receiver circuitry would be used at the other.

Transceivers

The link hardware consists of a millimeter-wave transceiver pair, including a pair of mmw antennas 24 and a pair of Ethernet switches 26 (one for each transceiver). The mmw signal is amplitude modulated and single-sideband filtered, and includes a reduced-level carrier. The tuner receiver includes a heterodyne mixer, phase-locked intermediate frequency (IF), and IF power detector. Transceiver A (FIG. 14) transmits at 71-73 GHz, and transceiver B (FIG. 14) transmits at 74-76 GHz. Transceiver A receives at 74-76 GHz and transceiver B receives at 71-73 GHz.

The transceiver at link end A is comprised of dish antenna 24, manufactured by Milliflect Corporation, the radio electronics are manufactured by the inventors, CPU 27 manufactured by Diamond Systems Corporation, and an external Ethernet switch 26 manufactured by Hewlett Packard Corporation. Signals received by antenna 24 pass through the Ortho-mode Transducer 12 and a 71-73 GHz bandpass filter 11, and are amplified by low-noise amplifier 10. After being amplified the signal is mixed with the 75 GHz Local Oscillator 8 signal by mixer 7 to result in a 2-4 GHz down-converted signal. This resulting 2-4 GHz signal is amplified by amplifier 6 made by Hittite Corporation and bandpass filtered 4, before being sent to the automatic gain control (AGC) circuit 5. After passing through the AGC circuit, the signal is power detected and lowpass filtered by detector circuit 3, to result in a baseband data signal. The baseband data signal is passed to clock and data recovery circuit 2 (using an Analog Devices ADN2809 clock recovery chip), which cleans up the data waveform shape before it is converted to an optical signal by the fiber-optic interface 1, manufactured by Finisar, Incorporated.

Data incoming from the user is acquired by the Ethernet switch 26, where it is combined with other Ethernet data, from the transceiver CPU 27 and from other user networks. The combined data stream from the Ethernet switch is sent to the Fiber-optic converter 1 and used to modulate the output of the 75 GHz Gunn oscillator 17 by diode modulator 15. The modulated signal is passed through the variable attenuator 25 and is then bandpass filtered 14 and sent to the Ortho-mode transducer 12 that routes the signal to the antenna 24.

The AGC circuit 5 senses the strength of the received signal and adjusts its level to present a fixed level to the detector circuit 3. The AGC circuit 5 also sends the sensed signal level to the CPU 27, which sends the level via the Ethernet switch 26 to the other end of the link. At the other end of the link, the Ethernet switch 26 routes the signal strength information to the CPU 27 which uses the signal strength information to command variable attenuator 25, adjusting the transmitted signal power.

Commercial Unit

A millimeter wave communication link ready for commercial application has been built and tested by Applicants. That link is described in detail below by reference to FIGS. 1 and 18 through 27B. This embodiment includes wireless point-to-point data communications link transceivers capable of supporting 155, 622, 1244 and 1250 Mbps data rates over distances of 0.1 to more than 10 miles. The data rates specified are commonly known as OC-3, OC-12, OC-24 and Gigabit Ethernet. A complete point-to-point data link would employ one of the described transceivers at each end of the data link. In a preferred embodiment, a transceiver at one end of the data link transmits in the 74-76 GHz frequency range and receives in the 71-73 GHz range. The transceiver at the other end of the data link transmits in the 71-73 GHz frequency range and receives at 74-76 GHz. Transceiver operations at each end of each link are identical except for the choice of frequencies. In a preferred embodiment, the transceiver electronics enclosure is mounted directly to a 2-foot diameter dish antenna. The use of 2-foot antennas allows link distances of up to 5 miles to be achieved in fair weather, with a bit error rate (BER) of less than 10.sup.-12, or distances of up to 1 mile to be achieved with rainfall rates of up 1.5" per hour. The implementation of the transceiver electronics and of the weather-resistant outdoor enclosure is disclosed.

Features of the Preferred Embodiment

The main features of the preferred radio are summarized below:

Receive Frequency Range 71-73 GHz

Transmit Frequency Range 74-76 GHz

Transmitter Output Power 40 mw (+16 dBm)

Data Rates (user selectable) 155, 622, 1244, or 1250 Mbps

Connection to User Network Fiber-optic connection, type LC

Connection to User Power 110 VAC

Power Consumption<50 watts

Weight (without antenna) 23 lbs.

Height (without antenna) 13"

Width (without antenna) 13"

Depth (without antenna or feedhorn) 10"

Depth (without antenna) 14"

User CPU interface 10 baseT

Ethernet-web browser interface or RS232 serial link

Transceiver Description

The transceiver uses a fiber-optic interface to connect to a user network, and transmits data wirelessly in the 74-76 GHz frequency band to another embodiment of the invention. The transceiver receives data from the other transceiver in the 71-73 GHz frequency band, and sends this data to the user network via the fiber-optic interface. The transceiver of this invention is composed of millimeter-wave electronics, Intermediate Frequency (IF) electronics, input/output electronics, and an outdoor-suited enclosure. The transceiver also contains a power supply and a Central Processing Unit (CPU) for status and health monitoring and radio control, and is connected directly to a Cassegrain-type dish antenna. Information is sent over the millimeter-wave link using simple on-off keying (amplitude modulation).

The transceiver electronics is explained by reference to FIGS. 20A and 20B. The transceiver 42 is comprised of dish antenna 24, manufactured by Milliflect Corporation, a radio electronics enclosure manufactured by Harmony Castings, millimeter-wave transmitter, millimeter-wave receiver, IF electronics, central processing unit (CPU) 27, and I/O electronics. Signals received by antenna 24 pass through feedhorn 51 and into the Ortho-mode Transducer 12 and a 71-73 GHz bandpass filter 11, and are amplified by low-noise amplifier 10. After being amplified the signal is filtered by second bandpass filter 11, and mixed with the 75 GHz Local Oscillator 8 signal by mixer 7 to result in a 2-4 GHz down-converted signal. This resulting 2-4 GHz signal is sent to automatic gain control (AGC) circuit 5. After passing through the AGC circuit, the signal is power detected and lowpass filtered by detector circuit 3, to result in a baseband data signal. The baseband data signal is then passed to clock and data recovery circuit 2 (using an Analog Devices ADN2819 clock recovery chip), which in turn cleans up the data waveform shape before it is converted to an optical signal by the fiber-optic interface 1.

Data incoming from the user network is sent to the Fiberoptic converter 1 and used to modulate the output of 75 GHz Gunn oscillator 17 by diode modulator 15. The modulated signal is passed through bandpass filtered 14 and sent to the Ortho-mode transducer 12 that routes the signal to the antenna 24 via feedhorn 51.

Detailed Description of Key Components of the Radio

Several of the key components of the invention have been fabricated by Applicants. A detailed description of these components is made with reference to FIGS. 17 through 27B. These components may be manufactured using techniques standard to the industry.

Power Supply

The power supply is connected to standard 110 VAC and supplies +12V, +5V, −12V for the various radio components via I/O Board 70 and Signal Conditioning & Clock Recovery Board 71. Power Supply 61 is model #ACE890, purchased from ICP America, Pomona Calif., or equivalent.

I/O Circuit Board

Connection to the user network, AC power main, and external world is made via I/O Circuit Board 70, shown in FIGS. 18A and B. I/O circuit board 70 is mounted to inner cover 53. The I/O Circuit board contains Fiber-Optic Interface 1, connections to Power Supply 61, an Ethernet Connection 71 from CPU 27 to the external environment, a USB connection from CPU 27 to the outside environment, and RS232 Serial Link connections from CPU 27 to the outside environment. The PC board is manufactured by Proto-Qwik, Incorporated, San Diego, Calif., or an equivalent PC board fabrication vendor and is assembled in-house.

Fiber-Optic Interface

Fiber optics interface 1 as shown in FIG. 15 converts optical signals to and from the user network to electrical signals used by the radio. The device supports data rates up to 1.25 Gbps and is part #FTRJ-8519-1, is manufactured by Finisar, Incorporated, Sunnyvale, Calif., or equivalent. Fiber-Optic Interface 1 is located on I/O circuit board 70 as shown in FIGS. 18A and B.

Signal Conditioning & Clock Recovery Board

Signal Conditioning & Clock Recovery Board 71 is shown in FIG. 17 and FIGS. 19A and B. The board is mounted to inner cover 53 and supports CPU 27. Power is supplied to CPU 27 and other radio electronics from Power supply 61, via I/O board 70, and through Signal Conditioning & Clock Recovery board 71. The PC board is manufactured by Proto-Qwik, Incorporated, San Diego, Calif., or an equivalent PC board fabrication vendor and is assembled in-house. Signal Conditioning & Clock Recovery Board 71 contains circuitry that performs the following functions:

Converts the +12V supplied by Power Supply 61 to +10V for Gunn Oscillators 8 and 17.

Converts the +5V to +3.3V for use by other circuits.

Provides +12V, +10V, +5V, and +3.3V to other circuitry in the radio.

Provides +12V, +10V, +5V, and +3.3V voltage measurements to CPU 27.

Provides +12V, +10V, +5V, and +3.3V current measurements to CPU 27.

Re-clocks and restores digital data received by the radio via Power Detector circuit 3 (using Clock and Data Recovery Circuit 73, part #ADN2819, manufactured by Analog Devices, Norwood, Mass.). The basic circuit design is also provided by Analog Devices and is incorporated into the design of Signal Conditioning & Clock Recovery Board 71.

Generates and Detects a $2^7$ Pseudo Random Bit Stream (PRBS7), using PRBS

Generator 74, part #TLK1501, manufactured by Texas Instruments, Corporation, Dallas, Tex. The basic circuit design is also provided by Texas Instruments and is incorporated into the design of Signal Conditioning & Clock Recovery Board 71.

Switches and selects the data stream presented to Diode Modulator 15, between incoming Fiber-Optic Converter 1, PRBS Generator 74, and Clock & Data Recovery Circuit 73. The data stream is selected by Crossbar Switch Circuit 72, part #TQ8004, manufactured by Triquint Semiconductor, Hillsboro, Oregon.

Generates clock signals using Oscillator Circuit 75, that allow Clock & Data Recovery Circuit 73 and PRBS Generator 74 to operate at data rates of 155, 622, 1244, and 1250 Mbps.

Senses the level of the received signal via AGC Circuit 76 on IF Circuit Board 80 and presents this level to CPU board 27.

Senses the level of the transmitted signal via Diode Modulator 15 and presents this level to CPU board 27.

CPU Board

The Central Processing Unit (CPU board 27) performs status monitoring, reporting, and control of various radio parameters and functions. CPU 27 is model "Prometheus", manufactured by Diamond Systems Corporation, Newark, Calif. CPU 27 is "PC/104" form factor compatible and runs a modified version of the LINUX operating system from flash memory. CPU 27 communicates with the outside environment via a 10 baseT Ethernet connection and two RS232 serial links (passed through I/O board 70). Software is configured to allow updates from remote locations via the Ethernet or serial connections. CPU board 27 contains 16 analog and 24 digital I/O signals, which are connected to the radio electronics via Signal Conditioning & Clock Recovery Board 71. The analog I/O signals on CPU 27 are used to monitor +12V, −12V, +5V, +3.3V, and the current flowing in each of these supplies, via Signal Conditioning & Clock Recovery Board 71. The analog I/O on CPU 27 is also used to sense the AGC level (received signal strength) and TX power (transmitted power level) of the radio via Signal Conditioning & Clock Recovery Board 71. Digital output signals from CPU 27 are used to configure the data path Crossbar Switch 72, manufactured by Triquint Semiconductor, Beaverton, Oreg., and to set the clock frequency used for the data path via Oscillator Circuit 75. The PC board is manufactured by Proto Qwik, Incorporated, San Diego, Calif., or an equivalent PC board fabrication vendor and assembled in-house.

IF Circuit Board

IF Circuit Board 80 receives a 2-4 GHz intermediate frequency (IF) signal from Mixer 7 and outputs a detected digital data stream to Clock & Data Recovery circuit 73. IF Board 80 is shown in FIG. 17 and FIGS. 20A and B. IF board 80 contains circuitry which performs the following functions:

Amplifies the output of Mixer 7 by approximately 30 dB and passes the amplified signal to Variable Attenuator 79, part #HMC346MS8G, manufactured by Hittite Microwave Corporation, Chelmsford, Mass.

Amplifies and Bandpass filters the output of Variable Attenuator 79 restrict the frequency band to 2-4 GHz and presents this filtered signal to Detector Circuit 78. Variable Attenuator 79 has a range of approximately 30 dB, allowing for a wide fluctuation in received signal level.

Senses the signal level detected by Detector Circuit 78 and adjusts Variable Attenuator 79 to maintain a constant preset signal level at the output of Detector Circuit 78, part #, manufactured by Mini-Circuits, Incorporated, Brooklyn, N.Y. The sensed signal level is also passed to CPU 27 via Signal Conditioning & Clock Recovery Board 71.

Detects the power in the signal using Detector Circuit 78, part #ADE-30W, manufactured by Mini-Circuits, Incorporated, Brooklyn, N.Y.

Feedhorn

Feedhorn 51 converts the signal received by Cassegrain antenna 24 to a circular waveguide connected to Ortho-Mode Transducer 12. A detailed drawing of Feedhorn 51 is shown in FIGS. 22A, B and C. Feedhorn 51 is mounted to Front Housing 52 by several screws and is sealed at the end with a plastic disk (not shown) to prevent water from entering the waveguide and Ortho-Mode Transducer 12. An O-ring (not shown) between feedhorn 51 and Front Housing 52 prevents the entry of water at this interface. Feedhorn 51 may be manufactured by Sisson Engineering, Northfield, Mass., or an equivalent machine shop.

Ortho-Mode Transducer

Ortho-Mode Transducer (OMT) 12 is attached to Feedhorn 51 and Bandpass Filters 11 and 14. OMT 12 is used to guide signals with horizontal polarization from antenna 24 via feedhorn 51 to bandpass filter 11, and route signals with vertical polarization from Diode Modulator 15 via Bandpass filter 14 to antenna 24 via feedhorn 51. OMT 12 separates signals with different polarizations into two separate paths, or combines signals with different polarizations into a common path, the common path being connected to antenna 24 via feedhorn 51. The use of OMT 12 allows a single antenna to be used for both transmission and reception without undo interference between transmitter and receiver. OMT 12 is manufactured by Sisson Engineering, Northfield, Mass., or an equivalent machine shop.

Bandpass Filters

Bandpass filters 11 and 14 are used to provide further isolation between the transmitted signal from diode modulator 15 and the low-noise amplifier 10. A mechanical drawing of the bandpass filter housing is shown in FIG. 23. The housing is manufactured by Sisson Engineering, Northfield, Mass., or an equivalent machine shop. Inside bandpass filters 11, 14, and 19 are shims containing a grid pattern, manufactured by Advanced Metal Etching, Ligonier, Ind. The grid pattern of the shims determines the spectral range over which the bandpass filter functions. Grid patterns for bandpass filters which operate at 71-73 GHz and 74-76 GHz are selected according to criteria set by the filter fabricator. Bandpass filters 11 and 19 are configured to pass frequencies in the range of 71-73 GHz. Bandpass filter 14 is configured to pass frequencies in the range of 74-76 GHz. Bandpass filter shims of different dimensions are used inside the Bandpass filter to achieve the different passband frequencies. A detail of the filter shim dimensions are available from the supplier.

Gunn oscillator 17 generates a transmit signal at 75 GHz which is modulated with data (from fiber-optic converter 1 via crossbar switch 72) by diode modulator 15 to produce a signal with a spectral range of 74-76 GHz. Bandpass filter 14 is configured to pass frequencies between 74 and 76 GHz and reject other frequencies, so that only signals in the range of 74-76 GHz may be transmitted, and unwanted emissions from Gunn oscillator 17 and modulator 15 are removed.

Signals incoming from antenna 24 via feedhorn 51 and OMT 12 are passed through Bandpass filter 11 and amplified by low-noise amplifier 10. Bandpass filter 11 is configured to pass only frequencies between 71 and 73 GHz to low-noise amplifier 10, insuring that signals from modulator 15 and bandpass filter 14 (at 74-76 GHz, for transmission) do not pass directly into the receiver. Signals from low-noise amplifier 10 are again filtered by bandpass filter 19 to remove any undesirable spectral components introduced by low-noise amplifier 10.

Diode Modulator

Diode Modulator 15 is used to impress a data stream onto the continuous output of Gunn oscillator 17. Diode modulator 15 turns the signal from Gunn oscillator 17 on and off, according to 1's and 0's appearing in the data stream from fiber-optic converter 1 (via crossbar switch 72). This on/off keyed signal is sent through bandpass filter 14, OMT 12 and feedhorn 51 to antenna 24.

Figure 24A:
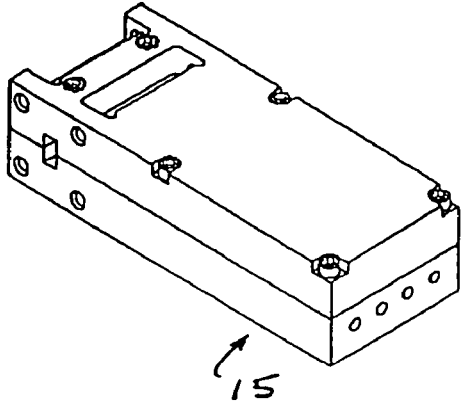
FIGS. 24A and 24B show details of a diode modulator 15.
Figure 24B:
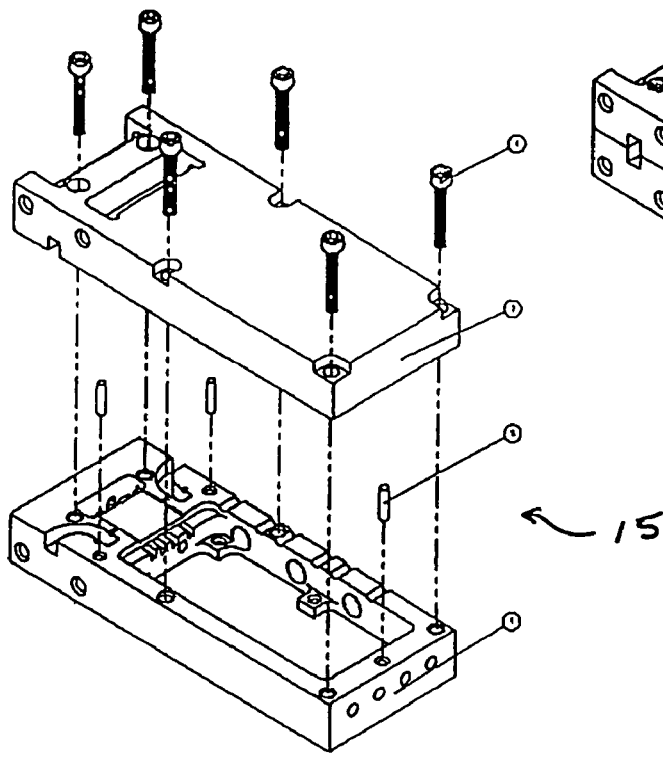
Figure 26B:
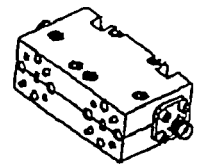
FIGS. 26A and B show details of mixer 7.
Figure 26A:
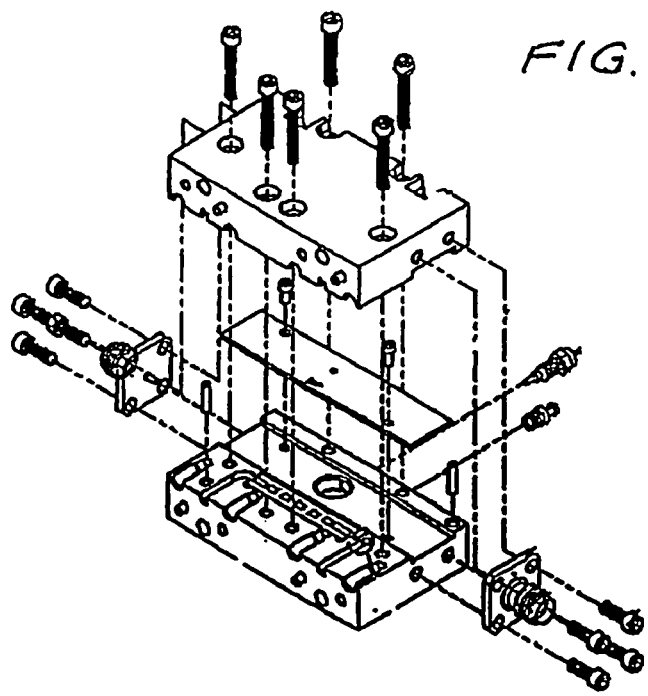

A drawing of the diode modulator 15 is shown in FIGS. 24A and B. The housing has been machined by Sisson Engineering, Northfield, Mass., or an equivalent machine shop. The modulator diode is part #MA4E2038, purchased from MACOM Corporation, Lowell, Mass., or equivalent. The diode is driven by a diode driver chip, part #VSC7928, manufactured by Vitesse Semiconductor, Camarillo, Calif. Modulator circuitry has been described above.

Gunn Oscillators

Gunn oscillators 8 and 17 are used to generate a CW (continuous wave) signal at 75 GHz. A drawing of the Gunn oscillator housing is shown in FIG. 25. The housing is manufactured by Sisson Engineering, Northfield, Mass., or an equivalent machine shop. The diode is part #LSW9177S2, manufactured by Filtronic Solid State, Santa Clara, Calif., or equivalent. By adjusting the depth of tuning rod 91 in cavity 92, the frequency of oscillation may be tuned from 71-76 GHz.

The output of Gunn oscillator 17 forms the power source for the transmitter and is passed to diode modulator 15. Gunn oscillator 17 produces approximately 60 milliwatts of output power, which results in about 40 milliwatts of power into antenna 24 after passing through modulator 15, bandpass filter 14, OMT 12, and feedhorn 51.

The output of Gunn oscillator 8 is the local oscillator signal for the receiver and is passed to mixer 7, where it is mixed with the 72-74 GHz signal received by antenna 24, via bandpass filter 11, low-noise amplifier 10, and second bandpass filter 11.

Low-Noise Amplifier

Figure 27B:
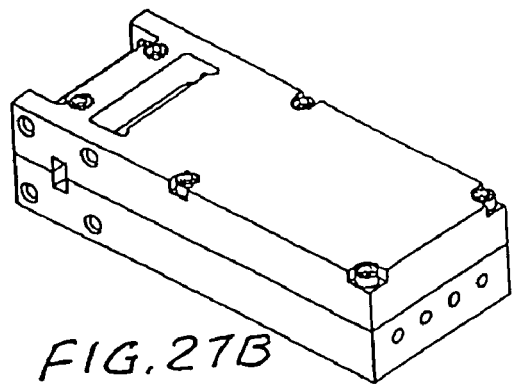
FIGS. 27A and B show details of low-noise amplifier 10.
Figure 27A:
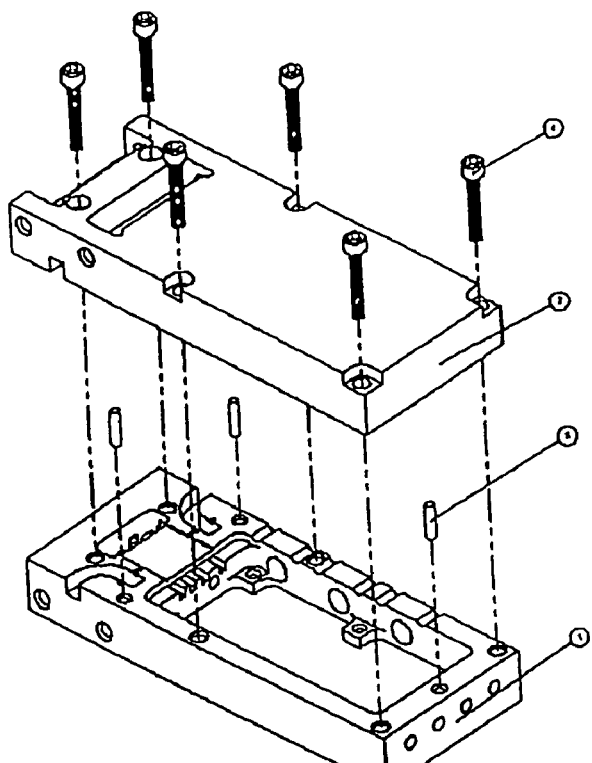

Low-noise amplifier 10 serves as the first amplifier for received signals. Signals received by antenna 24 pass through feedhorn 51, OMT 12, and bandpass filter 11 into low-noise amplifier 10. The output of low-noise amplifier 10 is passed to mixer 7 through second bandpass filter 11. The low noise amplifier is designed to have a 6 dB noise figure and to amplify signals between 70 and 95 GHz. The housing for low-noise amplifier 10 is shown in FIGS. 27A and B, and is manufactured by Sisson Engineering, Northfield, Mass., or an equivalent machine shop.

Mixer

Signals from Gunn oscillator 8 and second bandpass filter 11 are passed to mixer 7 which mixes the incoming received signal from bandpass filter II with the local oscillator signal from Gunn oscillator 8 to produce a 2-4 GHz intermediate frequency (IF) signal which is sent via amplifier 6 to IF board 80. The mixer housing is shown in FIGS. 27A and B, and is manufactured by Sisson Engineering, Northfield, Mass., or any suitable machine shop. Mixer diodes are part #HSCH9201, made by Agilent Corporation, Palo Alto, Calif., or equivalent.

Antenna

Antenna 24 used for the ground transceiver is a 2' dish antenna with a Cassegrain feed configuration, comprised of dish element 94 and secondary reflector 93. Dish element 94 is part #, manufactured by Milliflect Corporation, Colorado Springs, Colo. Secondary reflector 93 is manufactured by Marathon Machine, San Diego, Calif., or a similar machine shop. Signals collected by dish element 94 are reflected onto secondary reflector 93 and then into the radio electronics via feedhorn 51. Signals from the radio electronics pass out of feedhorn 51, onto secondary reflector 93, and bounce off of dish element 94 into free space.

Enclosure

Figure 1:
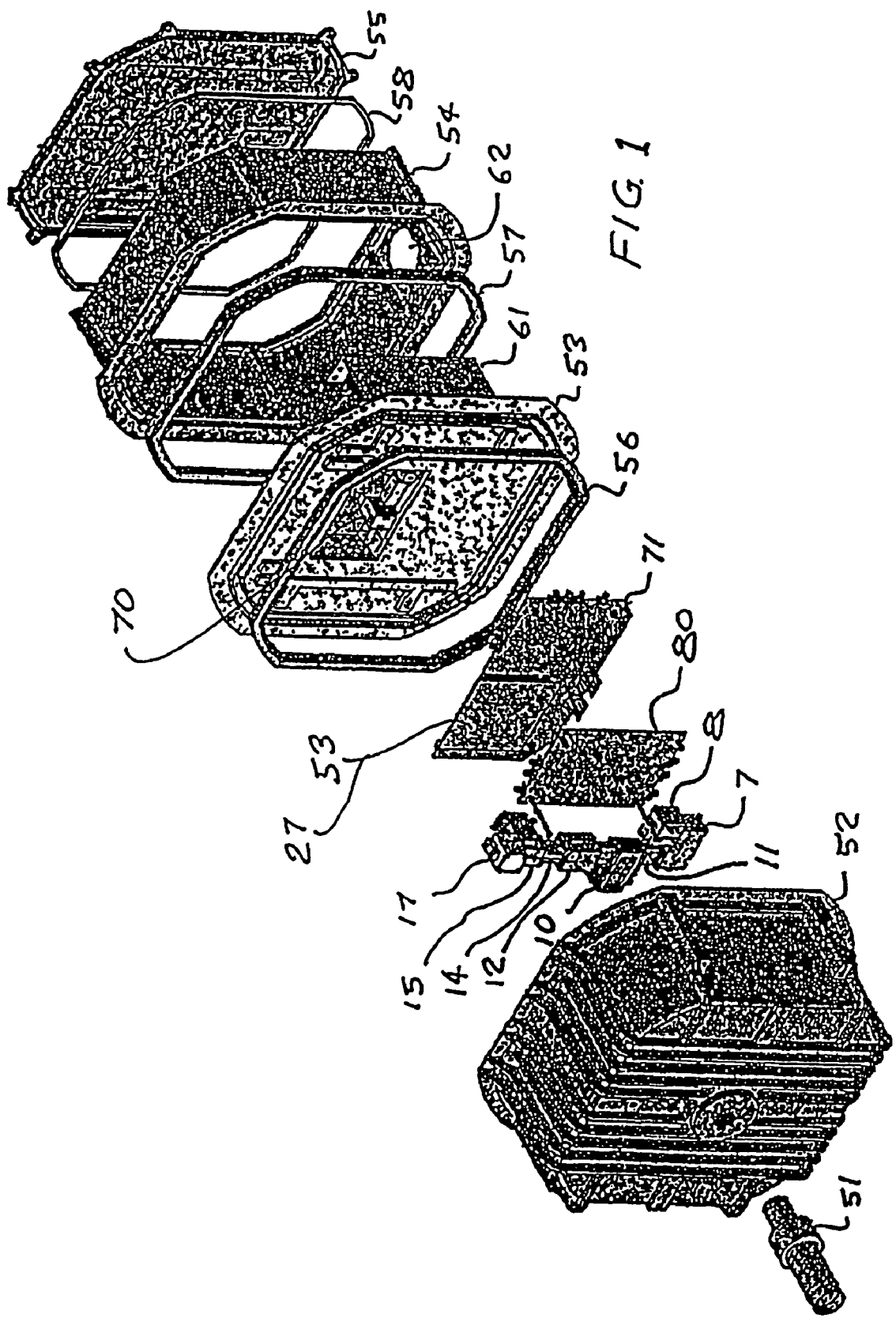
FIG. 1 shows components of a millimeter wave transceiver.
Figure 2:
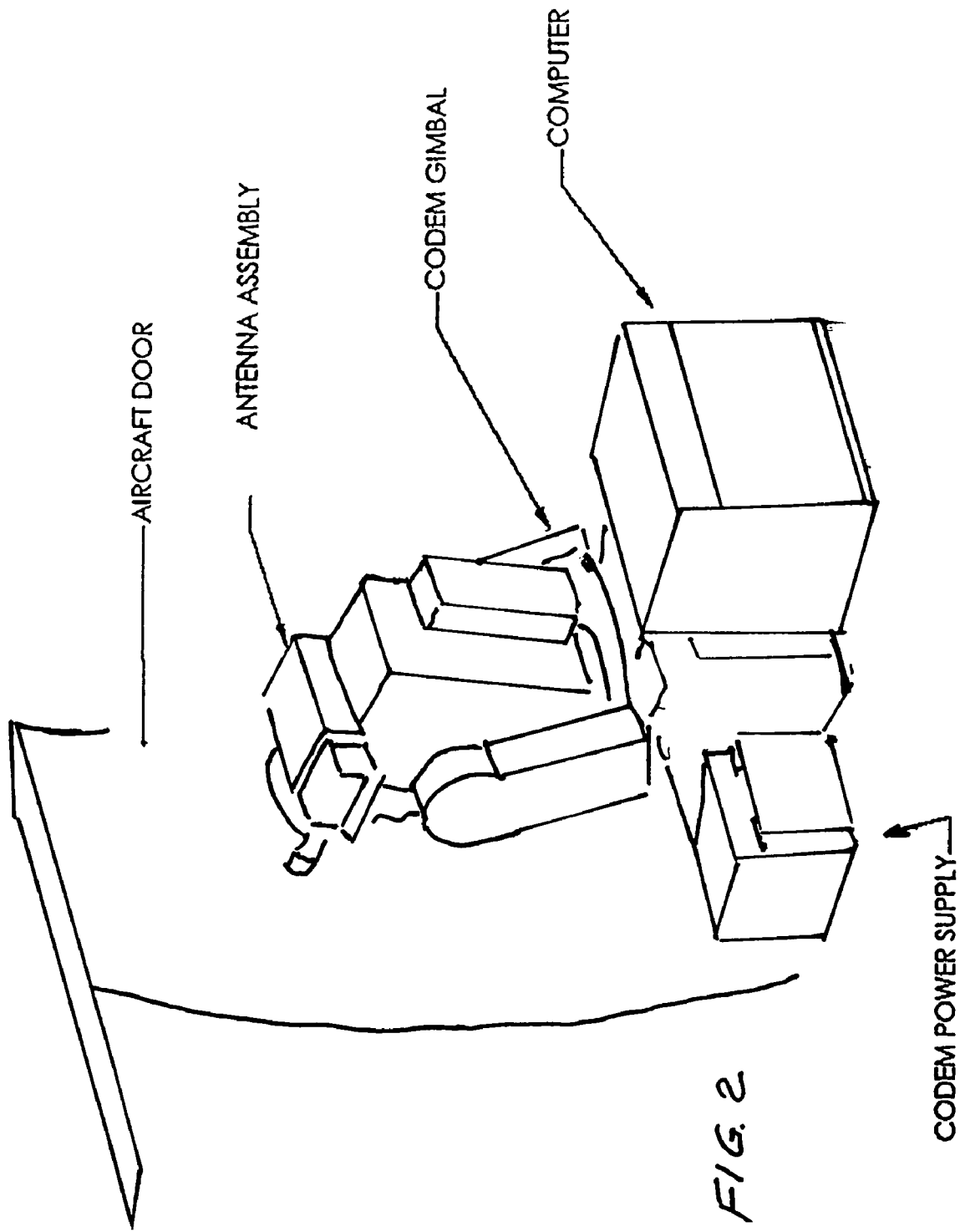
FIG. 2 shows a gimbaled transceiver looking out of an aircraft window.

The enclosure is shown in FIG. 1 and is composed of Front Housing 52, Inner Cover 53, Rear Housing 54, Rear Cover 55, manufactured by Harmony Castings, Harmony, Pa., and Gasket Seals 56, 57, and 58, manufactured by 3D Engineering, Pompano Beach, Fla. The housings, seals, and covers form a front chamber containing the millimeter-wave and other electronic components and a rear chamber containing the Power Supply 61 and connections to I/O Board 70. Feedhorn 51 protrudes through the Front Housing and is sealed by an O-ring (not shown) to form a water-tight seal. The front chamber is water-tight, and the rear chamber is water-tight when the rear cover is in place and the conduit connection hole 62 is seated or connected to a conduit. The two-chambered design allows factory work to be performed in the front chamber, and field/installation work to be performed in the rear chamber without exposing the front chamber electronics to any adverse environmental effects.

Single Local Oscillator per Transceiver

In the preferred embodiments described above each transceiver was provided with a local oscillator for transmission and a separate local oscillator for receiving. In other preferred embodiments each transceiver is equipped with only one local oscillator.

Transceivers transmit at either 72 GHz or 75 GHz and receive respectively at 75 GHz or 72 GHz. For example, at one link, we want to transmit at 75 GHz and receive at 72 GHz. If we operate an LO at 75 GHz, we can modulate it for the transmitted signal. Incoming signals at 72 GHz are mixed with this same LO signal and produce a 3 GHz intermediate frequency (IF) signal for the IF circuitry. At the other end of the data link, we want to transmit at 72 GHz and receive at 75 GHz. The LO at this other end of the link is operated at 72 GHz and modulated for the transmitted signal. This same LO frequency is mixed with incoming RF at 75 GHz to again produce a 3 GHz IF signal. This approach works because we have chosen transmit and receive frequencies that are separated by the amount of the IF frequency. We are able to choose such and IF due to the amount of overall spectrum available in the 71-76 GHz band, and the data rate employed by the radio (1.25 GHz).

Backup Microwave Transceiver Pair

During severe weather conditions data transmission quality will deteriorate at millimeter wave frequencies. Therefore, in preferred embodiments of the present invention a backup communication link is provided which automatically goes into action whenever a predetermined drop-off in quality transmission is detected. A preferred backup system is a microwave transceiver pair operating in the 10.7-11.7 GHz band. This frequency band is already allocated by the FCC for fixed point-to-point operation. FCC service rules parcel the band into channels of 40-MHz maximum bandwidth, limiting the maximum data rate for digital transmissions to 45 Mbps full duplex. Transceivers offering this data rate within this band are available off-the-shelf from vendors such as Western Multiplex Corporation (Models Lynx DS-3, Tsunami 100BaseT), and DMC Stratex Networks (Model DXR700 and Altium 155). The digital radios are licensed under FCC Part 101 regulations. The microwave antennas are Cassegrain dish antennas of 24-inch diameter. At this diameter, the half-power beamwidth of the dish antenna is 3.0 degrees, and the full-power beamwidth is 7.4 degrees, so the risk of interference is higher than for MMW antennas. To compensate this, the FCC allocates twelve separate transmit and twelve separate receive channels for spectrum coordination within the 10.7-11.7 GHz band. Sensing of a millimeter wave link failure and switching to redundant microwave channel is an existing automated feature of the network routing switching hardware available off-tie-shelf from vendors such as Cisco, Foundry Networks and Juniper Networks.

Narrow Beam Width Antennas

The narrow antenna beam widths afforded at millimeter-wave frequencies allow for geographical portioning of the airwaves, which is impossible at lower frequencies. This fact eliminates the need for band parceling (frequency sharing), and so enables wireless communications over a much larger bandwidth, and thus at much higher data rates, than were ever previously possible at lower RF frequencies.

The ability to manufacture and deploy antennas with beam widths narrow enough to ensure non-interference, requires mechanical tolerances, pointing accuracies, and electronic beam steering/tracking capabilities, which exceed the capabilities of the prior art in communications antennas. A preferred antenna for long-range communication at frequencies above 70 GHz has gain in excess of 50 dB, 100 times higher than direct-broadcast satellite dishes for the home, and 30 times higher than high-resolution weather radar antennas on aircraft. However, where interference is not a potential problem, antennas with dB gains of 40 to 45 may be preferred.

Most antennas used for high-gain applications utilize a large parabolic primary collector in one of a variety of geometries. The prime-focus antenna places the receiver directly at the focus of the parabola. The Cassegrain antenna places a convex hyperboloidal secondary reflector in front of the focus to reflect the focus back through an aperture in the primary to allow mounting the receiver behind the dish. (This is convenient since the dish is typically supported from behind as well.) The Gregorian antenna is similar to the Cassegrain antenna, except that the secondary mirror is a concave ellipsoid placed in back of the parabola's focus. An offset parabola rotates the focus away from the center of the dish for less aperture blockage and improved mounting geometry. Cassegrain, prime focus, and offset parabolic antennas are the preferred dish geometries for the MMW communication system.

A preferred primary dish reflector is a conductive parabola. The preferred surface tolerance on the dish is about 15 thousandths of an inch (15 mils) for applications below 40 GHz, but closer to 5 mils for use at 94 GHz. Typical hydroformed aluminum dishes give 15-mil surface tolerances, although double-skinned laminates (using two aluminum layers surrounding a spacer layer) could improve this to 5 mils. The secondary reflector in the Cassegrainian geometry is a small, machined aluminum "lollipop" which can be made to 1-mil tolerance without difficulty. Mounts for secondary reflectors and receiver waveguide horns preferably comprise mechanical fine-tuning adjustment for in-situ alignment on an antenna test range.

Flat Panel Antenna

Another preferred antenna for long-range MMW communication is a flat-panel slot array antenna such as that described by one of the present inventors and others in U.S. Pat. No. 6,037,908, issued Mar. 14, 2000 which is hereby incorporated herein by reference. That antenna is a planar phased array antenna propagating a traveling wave through the radiating aperture in a transverse electromagnetic (TEM) mode. A communications antenna would comprise a variant of that antenna incorporating the planar phased array, but eliminating the frequency-scanning characteristics of the antenna in the prior art by adding a hybrid traveling-wave/corporate feed. Flat plates holding a 5-mil surface tolerance are substantially cheaper and easier to fabricate than parabolic surfaces. Planar slot arrays utilize circuit-board processing techniques (e.g. photolithography), which are inherently very precise, rather than expensive high-precision machining.

Other Frequency Ranges

Any millimeter-wave carrier frequency consistent with U.S. Federal Communications Commission spectrum allocations and service rules, including MMW bands currently allocated for fixed point-to-point services at 57-64 GHz, 71-76 GHz, 81-86 GHz, and 92-100 GHz, can be utilized in the practice of this invention. Likewise any of the several currently-allocated microwave bands, including 5.2-5.9 GHz, 5.9-6.9 GHz, 10.7-11.7 GHz, 17.7-19.7 GHz, and 21.2-23.6 GHz can be utilized for the backup link. The modulation bandwidth of both the MMW and microwave channels can be increased, limited again only by FCC spectrum allocations. Also, any flat, conformal, or shaped antenna capable of transmitting the modulated carrier over the link distance in a means consistent with FCC emissions regulations can be used. Horns, prime focus and offset parabolic dishes, and planar slot arrays are all included. Although the preferred embodiments have been described in terms of frequency bands as 71-73 GHz and 74-76 GHz, it is expected that with recent FCC rulemaking, the preferred frequency bands in the future will be 71-76 GHz and 81-86 GHz.

Transmit Power

Transmit power may be generated with a Gunn diode source, an injection-locked amplifier or a MMW tube source resonating at the chosen carrier frequency or at any subharmonic of that frequency. Source power can be amplitude, frequency or phase modulated using a PIN switch, a mixer or a biphase or continuous phase modulator. Modulation can take the form of simple bi-state AM modulation, or can involve more than two symbol states; e.g. using quantized amplitude modulation (QAM). Double-sideband (DSB), single-sideband (SSB) or vestigial sideband (VSB) techniques can be used to pass, suppress or reduce one AM sideband and thereby affect bandwidth efficiency. Phase or frequency modulation schemes can also be used, including simple FM, bi-phase, or quadrature phase-shift keying (QPSK). Transmission with a full or suppressed carrier can be used. Digital source modulation can be performed at any date rate in bits per second up to eight times the modulation bandwidth in Hertz, using suitable symbol transmission schemes. Analog modulation can also be performed. A monolithic or discrete-component power amplifier can be incorporated after the modulator to boost the output power. Linear or circular polarization can be used in any combination with carrier frequencies to provide polarization and frequency diversity between transmitter and receiver channels. A pair of dishes can be used instead of a single dish to provide spatial diversity in a single transceiver as well.

The MMW Gunn diode and MMW amplifier can be made on indium phosphide, gallium arsenide, or metamorphic InP-on-GaAs. The MMW amplifier can be eliminated completely for short-range links. The detector can be made using silicon or gallium arsenide. The mixer/downconverter can be made on a monolithic integrated circuit or fabricated from discrete mixer diodes on doped silicon, gallium arsenide, or indium phosphide. The phase lock loop can use a microprocessor-controlled quadrature (I/Q) comparator or a scanning filter. The detector can be fabricated on silicon or gallium arsenide, or can comprise a heterostructure diode using indium antimonide.

One-Way High Data Rate Link

In some situations two-way high data rate are not required so a lower cost link can be provided using the principle of this invention but providing only one-way point-to-point high data rate communication. An example would be an un-manned Aerial Vehicle transmitting video data to a ground station. High data rates are needed on the air to ground link but high data rates are not needed for ground to air communication. In fact, in some cases, ground to air communications may not be needed at all. For these applications one of the stations would be equipped with a millimeter wave transmitter and the other with a millimeter wave receiver. In the case of the aircraft transmitter video data to the ground the millimeter wave transmitter would be on the aircraft. The aircraft radio system would not need the millimeter wave receiver components described above but would need other features shown in FIGS. 1 and 2 such as the GPS and inertial system unit and the antenna pointing controls for directing the millimeter wave beam to the known location of the ground station based on GPS and inertial systems data. The ground station would need the millimeter wave receiver equipment including preferably the larger antenna and pointing control equipment to keep the antenna pointed at the aircraft transmitter. In this case the GPS location of the aircraft could be transmitted to the ground station via the millimeter wave signals. The ground station would then use the GPS data to keep its antenna pointed at the aircraft. The aircraft GPS position could also be transmitted via a separate longer wavelength radio beam.

Alternatives to GPS

As explained above, utilization of GPS position data for antenna alignment is very advantageous in the case of millimeter wave radio communication between stations where at lease one station is mobile. However, other alignment techniques can be utilized. For example, some of the alignment techniques that were described in the parent application and are discussed above can be adapted to align the antenna without the use of the GPS equipment. In some cases the antenna can be aligned manually with a telescope. Beacons in the form of bright lamps, radio signals or laser beams can be used to align the antennas. Also, the antenna at each station can be aligned using feedback signals of receiver power from the other station. In this case each antenna is continuously adjusted to achieve maximum receiver power at the other station.

Mobile, Satellite, and Radio-Astronomy Standards

No technology in use today employs the 71-76 GHz or 81-86 GHz bands for mobile or satellite use, and use of these bands in radio astronomy is extremely limited. Fixed-service transceivers have demonstrated for the past two years the ability to provide reliable gigabit-speed data communications over free space at distances of one to ten miles. A significant aim of newly promulgated FCC rulemaking is to create the maximum potential for fixed-service users in the band today, while minimally impacting the future potential of the band for enabling new satellite, mobile, and radio astronomy services.

While the above description contains many specifications, the reader should not construe these as a limitation on the scope of the invention, but merely as exemplifications of preferred embodiments thereof. For example, the full allocated MMW band referred to in the description of the preferred embodiment described in detail above along with state of the art modulation schemes may permit transmittal of data at rates exceeding 10 Gbits per second. Such data rates would permit links compatible with 10-Gigabit Ethernet, a standard that is expected to become practical within the next two years. Ranges of about 1 mile to about 10 miles are ideal for the application of the present invention. However, in regions with mostly clear weather the system could provide good service to distances of 20 miles or more. Accordingly the reader is requested to determine the scope of the invention by the appended claims and their legal equivalents, and not by the examples given above.

What is claimed is:

1. A high-data-rate, line-of-sight millimeter wave communications system appropriate for transmitting information between a first platform and a second platform, at least said first platform being a mobile platform, said high-data-rate, line of sight millimeter wave communications system comprising:
- A) a first pointing radio system mounted in or on said first platform, said first pointing radio system comprising:
  1) a first GPS receiver for monitoring GPS positions of said mobile platform,
  2) a radio transmitter mounted on said moving platform, for transmitting GPS positions of said mobile platform to said second platform;
  3) a millimeter wave radio transmitter comprising a first millimeter wave antenna for transmitting information at frequencies in excess of 57 GHz and at data rates in excess of 100 Mbps within a half-power beamwidth of less than 4 degrees to said second platform;
  4) a first pointing apparatus with pointing controls programmed to point said first millimeter wave antenna toward said second platform based at least in part on position information provided by said first GPS receiver;
- B) a second pointing radio system mounted in or on said second platform, said second pointing radio system comprising:
  1) a radio receiver mounted on said second platform, for receiving GPS positions of said mobile platform from said mobile platform;
  2) a millimeter wave radio receiver comprising a second millimeter wave antenna for receiving information at frequencies in excess of 57 GHz and at data rates in excess of 100 Mbps from said mobile platform
  3) a second pointing apparatus with pointing controls programmed to point said second millimeter wave antenna toward said first platform based at least in part on position information provided by said first GPS receiver.

2. The communications system as in claim 1 wherein said first pointing radio system further comprises an inertial measurement system and said pointing controls of said first pointing apparatus are programmed to point said first antenna utilizing data provided by said inertial measurement system as well as GPS data.

3. A high-data-rate, line-of-sight millimeter wave communications system appropriate for transmitting information between a first platform and a second platform, at least said first platform being a mobile platform, said high-data-rate millimeter wave communications system comprising:
- A) a first pointing radio system mounted in or on said first platform, said first pointing radio system comprising:
  1) a first GPS receiver for monitoring GPS positions of said mobile platform,
  2) a radio transmitter mounted on said moving platform, for transmitting GPS positions of said mobile platform to said second platform;
  3) a millimeter wave radio receiver comprising a first millimeter wave antenna for receiving information at frequencies in excess of 57 GHz and at data rates in excess of 100 Mbps from said second platform;
  4) a first pointing apparatus with pointing controls programmed to point said first millimeter wave antenna toward said second platform based at least in part on position information provided by said first GPS receiver;
- B) a second pointing radio system mounted in or on said second platform, said second pointing radio system comprising:
  1) a radio receiver mounted on said second platform, for receiving GPS positions of said mobile platform from said mobile platform;
  2) a millimeter wave radio transmitter comprising a second millimeter wave antenna for transmitting information at frequencies in excess of 57 GHz within a half-power beamwidth of less than 2 degrees and at data rates in excess of 100 Mbps to said mobile platform
  3) a second pointing apparatus with pointing controls programmed to point said second millimeter wave antenna toward said first platform based at least in part on position information provided by said first GPS receiver.

4. The communications system as in claim 3 wherein said first pointing radio system further comprises an inertial measurement system and said pointing controls of said first pointing apparatus are programmed to point said first antenna utilizing data provided by said inertial measurement system as well as GPS data.

* * * * *